(12) United States Patent
Kumamoto et al.

(10) Patent No.: US 9,243,128 B2
(45) Date of Patent: Jan. 26, 2016

(54) COMPOSITE MATERIAL

(75) Inventors: Yoshiaki Kumamoto, Tochigi (JP); Kenta Mukai, Tochigi (JP); Hironobu Kawajiri, Tochigi (JP); Akira Takenaka, Wakayama (JP); Taiki Yoshino, Wakayama (JP); Akira Isogai, Tokyo (JP); Motoi Konishi, Wakayama (JP); Tetsuji Kito, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 13/514,883

(22) PCT Filed: Dec. 10, 2010

(86) PCT No.: PCT/JP2010/072260
§ 371 (c)(1),
(2), (4) Date: Jul. 17, 2012

(87) PCT Pub. No.: WO2011/071156
PCT Pub. Date: Jun. 16, 2011

(65) Prior Publication Data
US 2012/0283363 A1    Nov. 8, 2012

(30) Foreign Application Priority Data

Dec. 11, 2009  (JP) ................... 2009-282226
Dec. 11, 2009  (JP) ................... 2009-282227
Nov. 25, 2010  (JP) ................... 2010-262071
Dec.  2, 2010  (JP) ................... 2010-269128

(51) Int. Cl.
| | | |
|---|---|---|
| C08K 7/02 | (2006.01) | |
| C08J 5/04 | (2006.01) | |
| C08L 67/04 | (2006.01) | |
| C08B 15/04 | (2006.01) | |
| C08L 1/04 | (2006.01) | |
| C08L 97/02 | (2006.01) | |
| C08L 1/02 | (2006.01) | |

(52) U.S. Cl.
CPC . C08K 7/02 (2013.01); C08B 15/04 (2013.01); C08J 5/045 (2013.01); C08L 1/04 (2013.01); C08L 67/04 (2013.01); C08L 97/02 (2013.01); C08J 2367/04 (2013.01); C08L 1/02 (2013.01); C08L 2205/16 (2013.01); C08L 2205/18 (2013.01)

(58) Field of Classification Search
CPC .......................................................... C08K 7/02
USPC ............................................................ 524/35
See application file for complete search history.

(56) References Cited

U.S. PATENT DOCUMENTS

| | | | |
|---|---|---|---|
| 4,857,110 A * | 8/1989 | Dessauer et al. | ........... 106/208.2 |
| 6,103,790 A | 8/2000 | Cavaille et al. | |
| 6,824,645 B2 | 11/2004 | Jaschinski et al. | |
| 6,967,027 B1 * | 11/2005 | Heux et al. | ..................... 424/488 |
| 8,029,896 B2 | 10/2011 | Kumamoto et al. | |
| 2005/0067730 A1 | 3/2005 | Yano et al. | |
| 2009/0029169 A1 | 1/2009 | Takamoto et al. | |
| 2009/0054552 A1 * | 2/2009 | Yano et al. | ..................... 523/200 |
| 2010/0233481 A1 * | 9/2010 | Isogai et al. | .................. 428/401 |
| 2010/0316863 A1 | 12/2010 | Kumamoto et al. | |

FOREIGN PATENT DOCUMENTS

| | | |
|---|---|---|
| CN | 101133107 A | 2/2008 |
| CN | 101772516 A | 7/2010 |
| EP | 2184299 A1 | 5/2010 |
| JP | 7-118539 A | 5/1995 |
| JP | 2000-102730 A | 4/2000 |
| JP | 2001-336084 A | 12/2001 |
| JP | 2002-53670 A | 2/2002 |
| JP | 2003-201695 A | 7/2003 |
| JP | 3423094 B2 | 7/2003 |
| JP | 3641690 B2 | 4/2005 |
| JP | 2008-1728 A | 1/2008 |
| JP | 2009-52016 A | 3/2009 |
| JP | 2009-161723 A | 7/2009 |
| JP | 2009-176608 A | 8/2009 |
| JP | 2009-197122 A | 9/2009 |
| JP | 2009-242991 A | 10/2009 |
| JP | 2009-263850 A | 11/2009 |
| JP | 2010-242063 A | 10/2010 |
| JP | 2010-270315 A | 12/2010 |
| JP | 2011-47084 A | 3/2011 |
| WO | WO 0129309 A1 * | 4/2001 |
| WO | WO 2009020239 A1 * | 2/2009 |
| WO | WO 2009/069641 A1 | 6/2009 |
| WO | WO 2009069641 A1 * | 6/2009 |
| WO | WO 2010/055839 A1 | 5/2010 |

OTHER PUBLICATIONS

Bodenson, D., et al., "Dispersion and characteristics of surfactant modified cellulose whiskers nanocomposites," Composite Interfaces, 2007, 14, 617-630.*

(Continued)

*Primary Examiner* — Liam J Heincer
*Assistant Examiner* — Nicholas Hill
(74) *Attorney, Agent, or Firm* — Birch, Stewart, Kolasch & Birch, LLP

(57) ABSTRACT

A composite material of the invention is a mixture of cellulose microfibers having a carboxyl group content of 0.1 to 3 mmol/g and a moldable polymeric material selected from the group consisting of a biomass-derived polymer and a petroleum-derived polymer. The biomass-derived polymer is preferably polylactic acid or pulp. The cellulose microfibers are preferably present in an amount of 0.01% to 60% by mass. Another composite material of the invention is a mixture of cellulose composite microfibers and a moldable resin, the cellulose composite microfibers being obtained by adsorbing a surfactant onto cellulose microfibers having a carboxyl group content of 0.1 to 3 mmol/g.

6 Claims, No Drawings

(56) References Cited

OTHER PUBLICATIONS

Fukuzumi, H., et al., "Transparent and high gas barrier films of cellulose nanofibers prepared by TEMPO-mediated oxidation," Biomacromolecules, 2009, 10, 162-165.*

"Lactic Acid Homopolymer," Merck Index, 14th edition. Basic Physical Properties, Row (Record) No. 9333. Downloaded on Jan. 22, 2013.*

Mathew, A. P., et al., "The structural and mechanical properties of cellulose nanocomposites prepared by twin screw extrusion," Cellulose Nanocomposites, Chapter 9, ACS Symposium Series, vol. 938, p. 114-131, Jul. 13, 2006.*

International Search Report for PCT/JP2010/072260 dated Mar. 1, 2011.

International Preliminary Report on Patentability for International Patent Application No. PCT/JP2010/072260, mailed on Jul. 19, 2012.

Supplementary European Search Report for corresponding European Patent Application No. 1083675.1, dated Mar. 18, 2013.

* cited by examiner

COMPOSITE MATERIAL

TECHNICAL FIELD

The present invention relates to a cellulose microfiber-containing material containing cellulose microfibers with a nanoscale diameter and more particularly to a composite material containing cellulose microfibers and having high mechanical properties.

BACKGROUND ART

While plastic materials derived from petroleum that is a finite resource have been heavily used, the recent spotlight is focused on environmental load-reducing technologies. With this tendency, materials using cellulose fibers, which are biomass abundantly occurring in nature, have been attracting attention, and various techniques about the improvement thereon have been proposed. For example, patent literatures 1 and 2 below describe a paper material using oxidized pulp obtained by treating pulp with an oxidizing agent in the presence of an N-oxyl compound, such as 2,2,6,6-tetramethyl-1-piperizin-N-oxyl (hereinafter abbreviated as TEMPO).

A composite material obtained by mixing fibers with a nanoscale diameter (nanofibers), called microfibrils, with other materials is known. For example, patent literature 3 below discloses a composition containing a thermoplastic polymer matrix and a cellulose filler formed of cellulose microfibrils with a diameter of about 2 to 30 nm.

Patent literature 4 below describes a degradable or biodegradable polymer composition containing a biodegradable plastic and ascidian cellulose fibers. The ascidian cellulose fibers are microfibers with a diameter of 0.1 μm or less obtained by cutting the epitheca of ascidians with, e.g., a cutter, into pieces of about 5 to 20 mm, crushing the pieces using a mixer or a like machine, followed by microfibrillation using a beater or a like machine.

Patent literature 5 below describes a high strength material having a bending strength in a specific range as measured by a prescribed method of measurement, which contains 65% to 100% by weight of cellulose microfibrils and 0% to 35% by weight of an additive (e.g., a thermosetting resin, a thermoplastic resin, or starch) each based on the solids content.

The assignee common to this application previously proposed a gas barrier composite molded article having a layer of a gas barrier material containing cellulose fibers having an average fiber diameter of 200 nm or smaller and a carboxyl group content of 0.1 to 2 mmol/g (see patent literature 6 below). The cellulose fibers used here have a smaller diameters than conventional microfibers called nanofibers and are obtained by oxidizing natural cellulose fibers, such as wood pulp, in the presence of a TEMPO catalyst and subjecting the resulting oxidation product dispersion to a defibration operation using a mixer or a like device. The gas barrier composite molded article of patent literature 6 exhibits high gas barrier performance against various gases, including oxygen, water vapor, carbon dioxide, and nitrogen.

Non-patent literatures 1 through 3 below report obtaining a polylactic acid/cellulose nanowhisker (needle-like cellulose microfiber) composite material from a dispersion of cellulose nanowhiskers in an organic solvent, e.g., toluene, cyclohexane, or chloroform.

Cellulose nanowhiskers are obtained by hydrolysis of the amorphous regions of a cellulose raw material with sulfuric acid, followed by ultrasonication. Although the cellulose nanowhiskers are stably dispersible in water owing to the sulfuric acid group introduced into the cellulose units as a result of hydrolysis, they usually agglomerate or flocculate without being dispersed stably in an organic solvent, such as an alcohol or a non-aqueous solvent. In order to obtain a composite material composed of a plastic material such as polylactic acid and cellulose nanofibers such as cellulose nanowhiskers and exhibiting the full characteristics of the cellulose nanofibers, it is necessary to stably disperse the cellulose nanofibers in an organic solvent in which the plastic material is soluble. In this regard, the techniques of the non-patent literatures 1 to 3 achieve stably dispersing cellulose nanowhiskers in an organic solvent by modifying (hydrophobilizing) cellulose nanowhiskers by treating with an anionic surfactant, such as a phenyl-containing phosphoric ester.

Patent literature 6 supra also proposes a gas barrier material containing cellulose fibers having an average fiber diameter of 200 nm or smaller and a carboxyl group content of 0.1 to 2 mmol/g. The cellulose fibers are microfibers having a smaller diameter than conventional microfibers called nanofibers and are obtained by oxidizing natural cellulose fibers, such as wood pulp, in the presence of a TEMPO catalyst and subjecting the resulting oxidation product dispersion to a defibration operation using a mixer or a like device.

CITATION LIST

Patent Literature

Patent literature 1: U.S. Pat. No. 6,824,645B2
Patent literature 2: JP 2001-336084A
Patent literature 3: US 006103790A
Patent literature 4: JP Patent 3423094
Patent literature 5: US 2005/0067730A1
Patent literature 6: EP 2184299A1

Non Patent Literature

Non-patent literature 1: L. Heux, et al., Langmuir, 16 (21), 2000
Non-patent literature 2: C. Bonini, et al., Langmuir, 18 (8), 2002
Non-patent literature 3: L. Petersson, et all., Composites Science and Technology, 67, 2007

SUMMARY OF INVENTION

Technical Problem

As stated, we have seen various proposals on techniques relating to composite materials using cellulose nanofibers, for example, a composite material composed of a plastic material such as polylactic acid and cellulose nanofibers from the viewpoint of effective utilization of biomass. Nevertheless, conventional composite materials containing cellulose nanofibers are not considered as having sufficient mechanical strength and find difficulty in molded article applications, such as containers and electrical appliances, particularly applications where mechanical strength is required. While in some applications a composite material is required to have high transparency, conventional composite materials containing conventional cellulose nanofibers in amounts necessary to secure designed mechanical strength have poor transparency, resulting in a failure to meet the demand for transparency. An environmental load-reducing composite material having both high mechanical strength and transparency has not yet been provided.

Although the cellulose microfibers described in patent literature 6 are considered as a material responsive to such a demand, the cellulose microfibers essentially having high hydrophilicity exhibit poor dispersion stability in an organic solvent having different polarity or a resin and are difficult to mix with plastic materials to make composites.

Accordingly, the invention relates to the provision of an environmental load-reducing composite material having sufficient mechanical strength for practical use.

Solution to Problem

The present inventors have conducted extensive studies on a novel composite material containing the cellulose microfibers disclosed in patent literature 6 (cellulose fibers having an average fiber diameter of 200 nm or smaller and a carboxyl group content of 0.1 to 3 mmol/g). As a result, they have made a first discovery that a composite material obtained by uniformly mixing the cellulose microfibers and a biomass-derived polymer typified by polylactic acid has high elastic modulus, tensile strength, and transparency.

The inventors have also studied on a method for stably dispersing the cellulose microfibers disclosed in patent literature 6 (cellulose fibers having an average fiber diameter of 200 nm or smaller and a carboxyl group content of 0.1 to 2 mmol/g) in an organic solvent and made a second discovery that chemically adsorbing a specific surfactant onto the cellulose microfibers brings about improvement on dispersion stability of the fibers in an organic solvent.

A first aspect of the present invention, which is based on the first discovery, relates to a composite material including cellulose microfibers having a carboxyl group content of 0.1 to 3 mmol/g and a moldable polymeric material selected from the group consisting of a biomass-derived polymer and a petroleum-derived polymer.

The first aspect of the invention also relates to a method for producing the composite material. The method includes the steps of uniformly mixing the cellulose microfibers of powder form and the polymeric material and molding the resulting uniform mixture into a desired shape.

A second aspect of the invention, which is based on the second discovery, relates to a composite material obtained by mixing cellulose composite microfibers with a moldable resin. The cellulose composite microfibers consist of cellulose microfibers having a carboxyl group content of 0.1 to 3 mmol/g and a surfactant adsorbed on the cellulose microfibers. The second aspect of the invention also relates to a method for producing the composite material of the second aspect. The method includes the steps of uniformly mixing a dispersion of the cellulose composite microfibers in an organic solvent or the cellulose composite microfibers in powder form with the resin and molding the resulting uniform mixture into a desired shape.

Advantageous Effects of Invention

The composite material of the invention exhibits practically sufficient mechanical strength and produces reduced load on the environmental. The cellulose composite microfibers of the invention (second aspect) (cellulose microfiber-containing material) is excellent in dispersion stability in an organic solvent or a resin, which is advantageous for mixing with plastic materials, and able to provide an environmental load-reducing composite material having both high mechanical strength and transparency. A cellulose microfiber dispersion of the invention (second aspect) containing the cellulose composite microfibers has the same effects.

DESCRIPTION OF EMBODIMENTS

The first aspect of the invention will be described. The composite material of the invention (first aspect) contains two essential components: (1) cellulose microfibers having a carboxyl group content of 0.1 to 3 mmol/g and (2) a moldable polymeric material. The details of these two components will be given hereunder.

The cellulose microfibers for use in the invention (first aspect) preferably have an average fiber diameter of 200 nm or smaller, more preferably 100 nm or smaller, even more preferably 1 to 50 nm. A composite material containing cellulose fibers with an average diameter exceeding 200 nm can fail to exhibit sufficiently improved mechanical strength. The average fiber diameter is determined by the following method.

Method for Determining Average Fiber Diameter:

An aqueous dispersion containing 0.0001 mass % cellulose microfibers on a solid basis is prepared. The dispersion is dropped on mica and dried to make a specimen. The height of the cellulose microfibers of the specimen is measured using an atomic force microscope (AFM) (Nanoscope III Tapping mode AFM, from Digital Instrument; probe: Point Probe (NCH), from Nanosensors). From a micrograph in which the cellulose fibers are recognizable, at least five cellulose fibers are chosen to calculate an average fiber diameter from their heights. In general, the minimum unit of a cellulose nanofiber prepared from a higher plant consists of cellulose molecular chains packed in a 6×6 array within a square cross-section. Accordingly, the height analyzable on an AFM image is regarded as a fiber width.

It is preferred for the cellulose microfibers for use in the invention to have a carboxyl group content of 0.1 to 3 mmol/g, more preferably 0.1 to 2 mmol/g, even more preferably 0.4 to 2 mmol, and most preferably 0.6 to 1.8 mm/g, as well as an average fiber diameter of 200 nm or less. The composite material of the invention can unintentionally contain cellulose fibers whose carboxyl group content is out of the recited range as an impurity.

The carboxyl group content recited above is of importance for stably obtaining cellulose fibers with a diameter as small as 200 nm or less. The biosynthesis of natural cellulose usually involves formation of nanofibers called microfibrils which are bundled into higher order solid structures. As will be discussed later, the cellulose microfibers that can be used in the invention are obtained by making use of this structure in principle. That is, in order to weaken the interfacial hydrogen bond strength, which is the base of the strong cohesive force between microfibrils in a naturally occurring solid cellulose material, part of the hydrogen bonds are oxidized to carboxyl groups thereby providing the cellulose microfibers for use in the invention. So, cellulose with a larger total amount of the carboxyl groups (i.e., a higher carboxyl group content) is able to exist stably with smaller diameters. Furthermore, with an increased carboxyl group content, the tendency of the microfibrils in water to separate from each other (to lose their cohesion) increases because of electrical repulsion. As a result, the nanofibers will have further increased dispersion stability. With a carboxyl group content less than 0.1 mmol/g, it is difficult to obtain cellulose microfibers having a diameter as small as 200 nm or less, and the fibers can have reduced dispersion stability in a polar solvent, such as water. The carboxyl group content is determined as follows.

Method for Determining Carboxyl Group Content:

Cellulose fibers weighing 0.5 g on a dry basis are put in a 100 ml beaker, and ion exchanged water is added thereto to make 55 ml. In the beaker was put 5 ml of a 0.01 M aqueous solution of sodium chloride to prepare a dispersion, which was agitated until the cellulose fibers are thoroughly dispersed. The dispersion was adjusted to a pH of 2.5 to 3 by the addition of 0.1 M hydrochloric acid. To the dispersion is added dropwise a 0.05 M sodium hydroxide aqueous solution over 60 seconds using an automatic titration apparatus (AUT-50, from DKK-TOA Corp.). The electrical conductivity and pH are measured for every minute until the pH reaches about 11 to prepare an electric conductivity curve. The sodium hydroxide titer is obtained from the conductivity curve, which is substituted into the following equation to calculate the carboxyl group content of the cellulose fibers.

Carboxyl group content (mmol/g)=sodium hydroxide titer×sodium hydroxide aqueous solution concentration (0.05 M)/mass of cellulose fibers (0.5 g)

The cellulose microfibers for use in the invention preferably have an average aspect ratio (length/diameter) of 10 to 1000, more preferably 10 to 500, even more preferably 100 to 350. Fibers having an average aspect ratio falling within that range exhibit excellent dispersibility in a composite material and high mechanical strength, especially resistance to brittle fracture. The average aspect ratio is determined as follows.
Method for Determining Average Aspect Ratio:

The average aspect ratio is calculated from the viscosity of a dispersion prepared by adding water to the cellulose microfibers to a final concentration varying from 0.005 to 0.04 mass %. The viscosity of the dispersion is measured at 20° C. with a rheometer (MCR, equipped with a coaxial cylinder sensor DG42, both from PHYSICA). An average aspect ratio is obtained by substituting the relation between the mass concentration of the cellulose fibers in the dispersion and the specific viscosity of the dispersion (relative to the viscosity of water) into equation (1) below, followed by back-calculation. Equation (1) is derived from the viscosity equation of stiff, rod-like molecules (Eq. 8.138) described in M. Doi and S. F. Edwards, The Theory of Polymer Dynamics, Clarendon Press, Oxford, 1986, p. 312 and the relationship: $Lb^2 \times \rho = M/NA$, where L is a fiber length; b is a fiber breadth (the cellulose fiber cross section being regarded as a square); $\rho$ is a cellulose fiber concentration (kg/m$^3$); M is a molecular weight; and $N_A$ is Avogadro's number. In Eq. 8.138, stiff, rod-like molecules=cellulose microfibers. In equation (1), $\eta_{SP}$ is a specific viscosity; $\pi$ is a circular constant; ln is a natural logarithm; P is an aspect ratio (=L/b); $\gamma$=0.8; $\rho_S$ is the viscosity (kg/m$^3$) of a dispersion medium; $\rho_0$ is the density (kg/m$^3$) of cellulose crystals; and C is the mass concentration of cellulose (C=$\rho/\rho_s$).

[Math. 1]

$$\eta_{sp} = \frac{2\pi P^2}{45(\ln P - \gamma)} \times \frac{\rho_s}{\rho_0} \times C \qquad (1)$$

The carboxyl group possessed by the cellulose microfiber for use in the invention (first aspect) may be either of sodium salt form (COONa) or acid form (COOH).

The content of the cellulose microfibers in the composite material of the invention is decided as appropriate from the standpoint of the balance between mechanical strength and transparency. From the viewpoint of improvement on mechanical strength, it is generally preferred to increase the content of the cellulose microfibers, but too high a cellulose microfiber content can reduce flex resistance, extensibility, and transparency (the transparency essentially possessed by the polymeric material used in combination with the cellulose microfibers in the composite material). In this regard the cellulose microfiber content in the composite material is preferably in the range of from 0.01% to 60%, more preferably 0.05% to 10%, even more preferably 0.1% to 5%, by mass relative to the total mass of the composite material.

A suitable content of the cellulose microfibers varies depending on the type of the polymeric material used in combination. When in using polylactic acid (PLA) as a polymeric material, in particular, use of a relatively small amount (5% by mass or less) of the cellulose microfibers provides an environmental load-reducing composite material having both high mechanical strength and transparency. In using pulp as a polymeric material, a higher cellulose microfiber content (specifically 0.1 mass % or more) will provide an environmental load-reducing composite material having higher mechanical strength and higher transparency. In this regard, however, the cellulose microfiber content preferably ranges from 0.01% to 60% by mass in terms of flex resistance.

The cellulose microfibers for use in the invention are obtained by, for example, a method including the steps of oxidizing natural cellulose fiber to obtain reaction product fibers and microfibrillating the reaction product fibers. Hereinafter, each step will be described in detail.

The oxidation step starts with dispersing natural cellulose fiber in water to prepare a slurry. Specifically, natural cellulose fiber as a raw material is mixed with about 10 to 1000 times the mass of water on an absolute dry basis, followed by stirring in, e.g., a mixer. Examples of the natural cellulose fiber include wood pulp, such as softwood pulp and hardwood pulp; cotton pulp, such as cotton litter and cotton lint; non-wood pulp, such as straw pulp and bagasse pulp; and bacteria cellulose. They may be used either individually or as a combination of two or more thereof. The natural cellulose fiber may be subjected to a treatment for increasing the surface area, such as beating.

The natural cellulose fiber in water is then oxidized using an N-oxyl compound as a catalyst for oxidation to obtain a reaction product fibers. Examples of the N-oxyl compound that can be used as a cellulose oxidation catalyst include TEMPO, 4-acetamido-TEMPO, 4-carboxy-TEMPO, and 4-phosphonoxy-TEMPO. As to the amount the N-oxyl compound to be added, a catalytic amount will suffice. The amount is usually in a range of from 0.1% to 10% by mass with respect to the natural cellulose fiber as a raw material on an absolute dry basis.

In the step of oxidizing the natural cellulose fiber, a combination of an oxidizer (e.g., a hypohalous acid or a salt thereof, a halous acid or a salt thereof, per halic acid or a salt thereof, hydrogen peroxide, and a perorganic acid) and a re-oxidizer (e.g., an alkali metal bromide, such as sodium bromide) is used. Examples of preferably used oxidizers are alkali metal hypohalites, such as sodium hypochlorite and sodium hypobromite. The oxidizer is used in an amount usually of from about 1% to 100% by mass relative to the natural cellulose fiber as a raw material on an absolute dry basis. The re-oxidizer is used in an amount usually of from about 1% to 30% by mass relative to the natural cellulose fiber as a raw material on an absolute dry basis.

In the step of oxidizing the natural cellulose fiber, to accomplish efficient progress of the oxidation reaction of the natural cellulose fiber, the reaction system (the slurry) is desirably maintained at a pH ranging from 9 to 12. While the oxidation treating temperature (the temperature of the slurry) is arbitrarily chosen from the range 1° to 50° C., the reaction is possible at room temperature with no particular need of temperature control. The reaction time is preferably 1 to 240 minutes.

After the oxidation step and before the microfibrillation step, the reaction slurry is subjected to a purification step to remove impurities other than the reaction product fibers and water, including any unreacted oxidizer and various by-products, from the slurry. Because the reaction product fibers in this stage are not yet disintegrated into the nanofiber units, the purification step may be effected by, for example, repeating washing with water and filtration. The purification apparatus to be used is not particularly limited. The thus purified reaction fiber is then forwarded to the next microfibrillation step usually as it is impregnated with an appropriate amount of water or, where needed, after it is dried to a fibrous or powdered form.

In the microfibrillation step, the reaction product fibers after the purification step is dispersed in a solvent, such as water, and microfibrillated to obtain the cellulose microfibers of which the average fiber diameter and the average aspect ratio fall within the respective ranges above discussed.

Usually, water is a preferred solvent as a dispersion medium used in the microfibrillation step. Water-soluble organic solvents, including alcohols, ethers, and ketones, may also be used according to the purpose. Mixtures of these solvents are also suitably used. Examples of a dispersing machine for use in the microfibrillation include a pulper, a beater, a low pressure homogenizer, a high pressure homogenizer, a grinder, a cutter mill, a ball mill, a jet mill, a short-screw extruder, a twin-screw extruder, an ultrasonic agitator, and a household juicer-mixer. The solid concentration of the reaction product fibers to be microfibrillated is preferably not more than 50% by mass. With a solid concentration exceeding 50 mass %, extremely high energy would be needed for dispersing.

If necessary, the cellulose microfibers obtained by the microfibrillation step may be supplied either in the form of a liquid suspension with an adjusted solid concentration which is colorless transparent or opaque to the eye or in the form of dried powder, which should be understood not to be cellulose particles but powdered aggregates of cellulose fibers. When supplied in the form of a liquid suspension, the dispersion medium may be water or a mixture of water and an organic solvent (e.g., an alcohol, such as ethanol), a surfactant, an acid, a base, or the like.

Through the above discussed oxidation and microfibrillation treatments of natural cellulose fiber, the hydroxyl group at the C6 position of cellulose unit is selectively oxidized to a carboxyl group via an aldehyde group. There are thus obtained highly crystalline, microfibrillated cellulose fibers made of cellulose having a carboxyl group content of 0.1 to 3 mmol/g and having an average fiber diameter of 200 nm or smaller. The resulting highly crystalline cellulose fibers have a cellulose I type crystal structure. This means that the cellulose microfiber used in the invention is a fiber obtained by surface-oxidizing a naturally occurring cellulose solid material having the I type crystal structure, followed by microfibrillation. A natural cellulose fiber has a high-order solid structure composed of bundles of microfibers called microfibrils that are produced in the biosynthesis of cellulose. The strong cohesive force between the microfibrils (hydrogen bonds between surfaces of microfibrils) is weakened by the introduction of aldehyde or carboxyl in the oxidation treatment, followed by the microfibrillation treatment to give cellulose microfibers. The carboxyl group content may be increased or decreased within the specific range thereby to change the polarity by adjusting the oxidation conditions. The average fiber diameter, average fiber length, average aspect ratio, and the like of the cellulose fibers may be adjusted by the electrostatic repulsion of carboxyl groups or by the microfibrillation conditions.

The composite material of the invention (first aspect) contains a moldable polymeric material in addition to the above described cellulose microfibers. As used herein, the term "moldable polymeric material" means a polymeric material that is, either alone or as mixed with other material(s), processable by necessary processing into a prescribed shape and able to retain that shape for at least a given period of time. For instance, fossil-derived resins useful in ordinary plastic molding are included in the term "moldable polymeric material". The moldable polymeric material is a material capable of being shaped into an article of prescribed shape through necessary processing (treatment for transforming the polymeric material into a form different from its inherent form) and specifically includes those having thermoplasticity, those having thermosetting properties, those soluble in organic solvents, those dispersible in organic solvents, those soluble in water, and those dispersible in water. By the use of such a moldable polymeric material, the composite material of the invention is moldable into thin shaped articles, such as films and sheets; three-dimensional containers, such as boxes and bottles; housings for information appliances; and bodies of cars and the like.

The moldable polymeric materials (hereinafter also referred to simply as "polymeric materials") for use in the invention (first aspect) include (a) biomass-derived polymers and (b) petroleum-derived polymers. The biomass-derived polymers are defined to be biological organic polymers except fossil resources and include those having biodegradability similarly to the cellulose microfibers. Examples of preferred biomass-derived polymers are polylactic acid (PLA), polyglycolic acid, poly(3-hydroxybutanoic acid), bio-polyethylene, bio-polypropylene, bio-polyethylene terephthalate, bio-polycarbonate, and other thermoplastic polymers.

Besides PLA and others described above, polysaccharides such as pulp are also useful as biomass-derived polymers. Examples of suitable pulps include wood pulp, such as softwood pulp and hardwood pulp; non-wood pulp, such as hemp, bamboo, straw and kenaf; and cotton pulp, such as cotton litter and cotton lint. Examples of polysaccharides other than pulps include regenerated cellulose, such as rayon; polysaccharides, such as starch, chitin, chitosan, triacetyl cellulose (TAC), carboxymethyl cellulose (CMC), and polyuronic acid; and polysaccharide derivatives. All these polysaccharides are non-thermoplastic.

The petroleum-derived polymers for use in the invention (first aspect) are organic polymers obtained from fossil resources. Examples thereof include thermoplastic resins, such as polyolefin resins, polystyrene resins, nylon resins, methacrylic resins, acrylonitrile resins, butadiene resins, styrene resins, ethylene-vinyl acetate copolymers, ethylene-acrylic acid copolymers, and ionomers; and thermoplastic resins, such as epoxy resins, phenol resins, urea resins, and polyimide resins. These resins may be used either individually or combination of two or more thereof. If necessary, at least one modified resin selected from, for example, modified ethylene-vinyl acetate copolymers; modified ethylene acrylate polymers, acrylic acid-modified ethylene-vinyl acetate copolymers, maleic anhydride-modified polyolefin resins, epoxy-modified polyolefin resins, maleic anhydride-modified ethylene-acrylate copolymers, and maleic anhydride-modified vinyl acetate polymers may be used either alone (with no other resins combined) as a petroleum-derived polymer for use in the invention or in combination with other petroleum-derived polymer as an adhesive resin.

The content of the moldable polymeric material in the composite material of the invention is preferably 40% to 99.99%, more preferably 90% to 99.95%, even more preferably 95% to 99.9%, by mass relative to the total mass of the composite material to secure both high mechanical strength and transparency of the composite material.

The composite material of the invention (first aspect) is a mixture of the cellulose microfibers and the moldable polymeric material. That is, the composite material of the invention is a system in which the cellulose microfibers and the polymeric material are substantially uniformly dispersed. Neither of the two components is substantially localized, nor is there a layer composed mainly of the cellulose microfibers or the polymer.

If desired, the composite material of the invention may contain components other than the above described two components, for example, inorganic materials, such as clay minerals, inorganic substances, and metallic substances, typified by glass or concrete. The composite material of the invention may further contain additives, such as a softening agent and a nucleating agent.

The composite material of the invention is moldable into any shape and is provided as thin shaped articles, such as films and sheets, blocks, such as rectangular parallelepipeds and cubes, and other three-dimensional shaped articles. The thickness of, for example, a thin shaped article is not particularly limited but usually ranges from 0.05 to 50 mm.

The composite material of the invention (first aspect) is produced by, for example, mixing the cellulose microfibers and the polymeric material to obtain a uniform mixture and molding the uniform mixture into a desired shape.

The form of the cellulose microfibers used as a material of the composite material of the invention is selected from, for example, powder, which should be understood not to be cellulose particles but powdered aggregates of cellulose fibers, and liquid suspension that is colorless transparent or opaque to the eye, with consideration given to the type of the polymeric material used in combination, the apparatus used for kneading, and other factors. In particular, the cellulose microfibers of powder form are dispersible uniformly in the composite material matrix (the polymeric material) so that sufficient mechanical strength for practical use is obtained with a relatively small amount of the cellulose microfibers, specifically 5% by mass or less.

Examples of the cellulose microfibers of powder form include a dried product obtained by drying an aqueous dispersion of the cellulose microfibers; powder obtained by mechanically processing the dried product; a product obtained by mixing an aqueous dispersion of the cellulose microfibers with a nonaqueous solvent, such as an alcohol, to agglomerate or flocculate the fibers and drying the resulting agglomerate; the agglomerate as it is undried; powder obtained by spray-drying an aqueous dispersion of the cellulose microfibers in a known manner; and powder obtained by freeze-drying an aqueous dispersion of the cellulose microfibers in a known manner. The spray-drying method as referred to above is a technique consisting of atomizing an aqueous dispersion of the cellulose microfibers in the air.

The cellulose microfibers of liquid suspension form may be the cellulose microfibers as dispersed in water or a dispersion of the cellulose microfibers of powder form in a desired medium. The medium is chosen as appropriate according to the type of the polymeric material to be mixed with, the method of mixing, and the method of molding. For example, when polylactic acid is used as a polymeric material, and the composite material is produced by a melt kneading method (hereinafter described), it is desirable to use an organic solvent as the medium. Using water or an alcohol as the medium is unfavorable in that case; for it can cause hydrolysis of polylactic acid to proceed. The organic solvent is typically exemplified by triethylene glycol monomethyl ether diester of succinic acid (hereinafter "di(methyl triglycol) succinate"). When pulp is used as a polymeric material, and the composite material is produced by a casting method (hereinafter described), water or an alcohol is a preferred medium in view of dispersing ability.

In the cases where the polymeric material to be combined with the cellulose microfibers is a biomass-derived thermoplastic polymer (e.g., polylactic acid) or a petroleum-derived polymer, the composite material of the invention is produced by, for example, a method called melt kneading including the steps of adding the cellulose microfibers to the polymeric material in a heated molten state, kneading the mixture while the polymeric material maintains the molten state, and molding the resulting uniform mixture. A known kneading machine may be used, such as a single-screw compounding extruder, a twin-screw compounding extruder, and a pressure kneader. For example, when in using a thermoplastic resin, such as polylactic acid, as the polymeric material, the cellulose microfibers of powder form (hereinafter also referred to as cellulose nanofiber powder) are added to the thermoplastic resin in a molten state and uniformly dispersed in the molten resin using a twin-screw compounding extruder to obtain resin pellets. The resin pellets may be compressed under heating to make a composite material of sheet form or molded into a composite material of block or other three dimensional shapes by known plastic molding techniques, such as injection molding, cast molding, extrusion, blow molding, stretch molding, and expansion molding.

Flow casting is another method for producing the composite material. Flow casting is a method including the steps of providing a fluid mixture by dispersing or dissolving the cellulose microfibers and the polymeric material in a solvent, casting the mixture on a substrate, removing the solvent to form a film or a sheet, and hot-pressing the film or the sheet to obtain a composite material of thin shape. For example, the fluid mixture may be prepared by adding the cellulose nanofiber powder to a solution of the polymeric material in an organic solvent, and the resulting fluid mixture is cast to obtain a composite material of film or sheet form. The flow casting method is broadly applicable irrespective of the type of the polymeric material, i.e. to all of the biomass-derived polymers and synthetic polymers.

In the flow casting method, removal of the solvent from a fluid mixture cast on a substrate is accomplished by, for example, using a liquid permeable substrate, such as a porous substrate having a number of openings penetrating the thickness thereof through which a liquid is allowed to pass. Upon casting the fluid mixture on the liquid permeable substrate, the solvent of the fluid mixture passes through the porous substrate to leave the solid matter (the cellulose microfibers and the polymeric material) on the porous substrate. Another method for the solvent removal is to dry the fluid mixture cast on a substrate spontaneously or by application of heat, e.g., hot air. The hot pressing in the flow casting method is carried out using a known apparatus, such as a metallic platen or rotary hot press.

In the case where the polymeric material combined with the cellulose microfibers is a polysaccharide, which is a non-thermoplastic biomass-derived polymer, such as pulp, the uniform mixture of the cellulose microfibers and the polymeric material is conveniently prepared by a method including the steps of dispersing the cellulose microfibers in a solvent, e.g., water to make a slurry, adding and dispersing the polymeric material (i.e., the polysaccharide) and, if desired, other components (e.g., the above described inorganic material) in the slurry to provide a uniform mixture. Usually, water is a preferred solvent in the uniform mixture (slurry). Water-soluble organic solvents, including alcohols, ethers, and ketones, may also be used according to the purpose. Mixtures of these solvents are also suitably used. The solid concentration of the uniform mixture is preferably not more than 30% by mass in terms of ease of dispersing operation. Examples of a dispersing machine used to prepare the dispersion include a pulper, a beater, a low pressure homogenizer, a high pressure homogenizer, a grinder, a cutter mill, a ball mill, a jet mill, a short-screw extruder, a twin-screw extruder, an ultrasonic agitator, and a household juicer-mixer.

The composite material of the invention (first aspect) is also produced by a wet papermaking technique. A wet papermaking technique is especially effective when the polymeric material to be used together with the cellulose microfibers is a polysaccharide, which is a non-thermoplastic biomass-derived polymer, such as pulp. In this method, the cellulose microfibers and the polymeric material (polysaccharide) are uniformly mixed to prepare a slurry. The slurry is fed on a forming wire of a paper machine to form a wet web (a wet composite material of sheet form), which is then dried after, if necessary, dewatering to obtain a composite material of sheet form.

The steps of dewatering and drying the wet web are carried out by, for example, making use of a press section and a drier section, respectively, of a general paper machine. Specifically, the wet web is compressed from both sides thereof, if necessary with felt applied thereto, to squeeze water out of the web in the press section. The dewatered wet fiber web is then moved to the drier section, wherein the web is dried using a drying unit to provide a composite material of sheet form. The drying unit is not particularly limited, and a Yankee drier or an air-through drier may be used. Examples of suitable paper machines include a Fourdrinier paper machine, a twin-wire paper machine, an on-top former, a hybrid former, and a cylinder paper machine. The wet papermaking method is employable to not only the production of composite materials of sheet form but the production of composite materials of desired three-dimensional shape.

The composite material of the invention (first aspect) is also produced by an impregnation method. That is, the composite material of the invention may be an article obtained by impregnating a fiber aggregate made mainly of the cellulose microfibers with a liquid containing the polymeric material. The fiber aggregate contains substantially no polymeric material and has a sheet form or a three-dimensional shape. The fiber aggregate is made by, for example, a known wet papermaking or pulp molding method. In the impregnation method, the fiber aggregate is soaked in a liquid containing the polymeric material to make the liquid penetrate deep inside the fiber aggregate. The liquid containing the polymeric material is prepared by dispersing or dissolving the polymeric material in an appropriate solvent, such as water. The fiber aggregate impregnated with the polymeric material-containing liquid is dried spontaneously or by application of heat, e.g., hot air to provide a composite material of desired shape.

It is preferred for the composite material of the invention (first aspect) to have sufficient mechanical strength for practical use. More specifically, the composite material of the invention preferably has a tensile modulus and a tensile yield strength both at least 1.1 times, more preferably 1.3 or more times, even more preferably 1.5 or more times, those of the base polymer. As used herein, the term "base polymer" denotes the polymeric material used in the invention in combination with the cellulose microfibers, i.e., a biomass-derived polymer and/or a petroleum-derived polymer. The composite material obtained by any of the aforementioned methods have a tensile modulus and a tensile yield strength falling within the respective ranges recited above, namely sufficient mechanical strength for practical use. Tensile modulus and tensile yield strength are determined by the following methods.

Method for Measuring Tensile Modulus and Tensile Yield Strength:

Method A or B described below is followed. In Examples and Comparative Examples hereinafter given, method A was adopted in Examples A1 to A5 and A7 to A10 and Comparative Examples A1-A6, A8, and A9, while method B was used in Example A6 and Comparative Example A7.

Method A:

A tensile-compression tester RTA-500 (from Orientech Co., Ltd.) is used. Tensile modulus and tensile yield strength are measured by a tensile test in accordance with JIS K7113. A JIS No. 3 dumbbell specimen punched out of a composite material is set on the tester at an initial jaw separation of 80 mm and pulled at a cross head speed of 10 mm/min.

Method B:

Tensile modulus and tensile yield strength of the composite material are measured by a tensile test using a tensile-compression tester RTA-500 (from Orientech Co., Ltd.). A specimen measuring 1 cm in width and 4 cm in length cut out of a composite material is set on the tester at an initial jaw separation of 20 mm and pulled at a cross head speed of 10 mm/min.

The invention (first aspect) allows for the provision of a highly transparent composite material. When combined with polylactic acid, in particular, as a polymeric material, the cellulose microfibers secure high mechanical strength in the composite material at a relatively low content (5 mass % or less) so that a composite material with practically sufficient mechanical strength is obtained without substantially impairing the high transparency inherent to polylactic acid. When pulp is used as a polymeric material, the resulting composite material will exhibit higher mechanical strength and higher transparency as the cellulose microfiber content increases. The term "high transparency" as used herein is intended to mean a total light transmittance level of 50% or more, preferably 70% or more. The total light transmittance is measured as follows.

Method for Measuring Total Light Transmittance:

The total light transmittance of a composite material is measured using a hazemeter NDH5000 (from Nippon Denshoku Industries) in accordance with JIS K7361-1.

The second aspect of the invention will then be described. The cellulose microfiber dispersion of the invention (second aspect) (hereinafter also referred to as a cellulose fiber dispersion) will be described along with cellulose composite microfibers of the invention (hereinafter also referred to as cellulose composite fibers), one of the components making up the cellulose microfiber dispersion. The cellulose microfiber dispersion of the invention contains (1) cellulose microfibers having a carboxyl group content of 0.1 to 3 mmol/g, (2) a surfactant, and (3) an organic solvent as essential components.

In the cellulose microfiber dispersion of the invention (second aspect), the surfactant is not dispersed in the dispersion together with the cellulose microfibers but adsorbed onto the cellulose microfibers. That is, the cellulose microfiber dispersion of the invention contains the cellulose composite microfibers of the invention having a surfactant adsorbed on the cellulose microfibers and an organic solvent. The cellulose composite microfibers are dispersed in the organic solvent. The mode of the adsorption of the surfactant to the cellulose microfibers in the cellulose composite microfibers of the invention is physical adsorption by Van der Waals force or chemical adsorption. In particular, a surfactant such as an alkylamine is chemically adsorbed to the C6 carboxyl group of the cellulose unit of the cellulose microfibers. The amount of the surfactant adsorbed to the cellulose microfibers is determined by known analytical procedures, such as elemental analysis or infrared spectrophotometry.

As will be described, the cellulose composite microfibers of the invention are obtained as an intermediate product in the preparation of the cellulose microfiber dispersion of the invention. Specifically, it is obtained by adding a surfactant to an aqueous dispersion of the cellulose microfibers. After the surfactant addition, the solvent (water) is removed from the aqueous dispersion to give cellulose composite microfibers of powdered form. The components (1) to (3) described supra will be sequentially described in detail.

The cellulose microfibers used in the second aspect of the invention are the same as those used in the first aspect and may be produced by the same method including the steps of oxidation and microfibrillation. So, the description given to the cellulose microfibers for use in the first aspect applies appropriately to those for use in the second aspect. In the second aspect of the invention, the step of microfibrillation may be conducted either after the above discussed step of purification or, as will be described later, after the step of adding a surfactant that follows the step of oxidation in the hereinafter described second method of the invention for producing the cellulose fiber dispersion of the invention (second aspect). The reaction product fibers (cellulose microfibers) obtained by the oxidation step may have carboxyl groups in either of sodium salt form (COONa) or acid form (COOH) similarly to the cellulose microfibers used in the first aspect.

The cellulose microfiber dispersion of the invention (second aspect) contains an organic solvent as a main dispersing medium. The cellulose microfiber dispersion contains a surfactant for the purpose of stably dispersing the cellulose microfibers. As stated above, the surfactant is present not in a dispersed state in the dispersion but in an adsorbed state onto the cellulose microfibers. The surfactant is preferably at least one member selected from the group consisting of cationic surfactants, anionic surfactants, nonionic surfactants, and amphoteric surfactants. Cationic surfactants are particularly preferred for their high adsorbability to the cellulose microfibers. Cationic surfactants include primary to tertiary amine compounds and quaternary ammonium compounds. The primary to tertiary amine compounds are preferably compounds having been cationized in an acidic condition.

Of the surfactants described above cationic surfactants are preferred. Quaternary ammonium compounds or primary to tertiary amine compounds are particularly preferred. The surfactant to be used is selected appropriately according to the organic solvent, still another essential component of the cellulose microfiber dispersion of the invention. For example, in using the hereinafter described polar solvent as the organic solvent, it is preferred to use a quaternary alkylammonium compound having alkyl groups of 1 to 40, more preferably 2 to 20, even more preferably 2 to 8, carbon atoms as the quaternary ammonium compound (cationic surfactant) or a primary to tertiary alkylamine compound as the primary to tertiary amine compound (cationic surfactant). Examples of the C1-C40 quaternary alkylammonium compounds include tetraethylammonium hydroxide (TEAH), tetraethylammonium chloride, tetrabutylammonium hydroxide (TBAH), tetrabutylammonium chloride, lauryltrimethylammonium chloride, dilauryldimethylammonium chloride, stearyltrimethylammonium chloride, distearyldimethylammonium chloride, cetyltrimethylammonium chloride, an alkylbenzyldimethylammonium chloride, and coconut amine. Examples of the primary to tertiary alkylamine compounds include ethylamine, diethylamine, triethylamine, butylamine, dibutylamine, tributylamine, octylamine, dioctylamine, trioctylamine, dodecylamine, didodecylamine, tridodecylamine, stearylamine, and distearylamine.

The organic solvent for use in the invention (second aspect) is preferably a polar solvent in terms of improving dispersion stability of the cellulose microfibers.

Examples of the polar solvent for use in the invention include ethanol, isopropyl alcohol, N,N-dimethylformamide (DMF), dimethyl sulfoxide (DMSO), N,N-dimethylacetamide, tetrahydrofuran (THF), di(methyl triglycol) succinate, acetone, acetonitrile, and acetic acid. These solvents may be used either individually or in combination of two or more thereof. Particularly preferred of them are di(methyl triglycol) succinate, ethanol, and DMF.

The contents of the three components (cellulose microfibers, surfactant, and organic solvent) in the cellulose microfiber dispersion of the invention (second aspect) are decided as appropriate with considerations given to the balance between development of the characteristics possessed by the cellulose microfibers and the dispersion stability of the cellulose microfibers. The content of the cellulose microfiber in the cellulose microfiber dispersion of the invention is preferably 0.01% to 60%, more preferably 0.1% to 10%, by mass. The content of the surfactant is preferably 0.001% to 50%, more preferably 0.01% to 10%, by mass. The content of the organic solvent is preferably 10% to 99.99%, more preferably 50% to 99%, by mass.

The cellulose microfiber dispersion of the invention may contain water as a dispersing medium in addition to the above described three components. In that case, the dispersing medium of the cellulose microfiber dispersion is a mixture of an organic solvent and water. The organic solvent to water mass ratio (organic solvent/water) is preferably 1 or more, more preferably 1 to 1000, even more preferably 4 to 1000. The content of water in the cellulose microfiber dispersion of the invention is preferably 0% to 50%, more preferably 0% to 10%, by mass.

If desired, the cellulose microfiber dispersion of the invention may further contain other components, such as clay minerals, inorganic substances, and metals, in addition to the above described three components and water. The total content of these other components is preferably up to 50% by mass.

The cellulose microfiber dispersion of the invention (second aspect) is prepared by, for example, a first method described below. The first method for preparing the cellulose microfiber dispersion of the invention includes the steps of adding a surfactant to an aqueous dispersion of the cellulose microfibers having a carboxyl group content of 0.1 to 3 mmol/g, dewatering and concentrating the aqueous dispersion to obtain a solid containing the cellulose microfibers, and dispersing the solid in a solvent containing an organic solvent.

The method for preparing a cellulose microfiber dispersion of the invention starts with preparation of an aqueous dispersion of the cellulose microfibers in water. The aqueous dispersion is obtained by adding, to the cellulose microfibers, about 10 to 1000 times as much water as the mass (on an absolute dry basis) of the cellulose microfibers as a raw material and treating the mixture in a dispersing machine or the like. The aqueous dispersion is transparent at ambient temperature. To facilitate the dispersing operation, the solid concentration (concentration of the cellulose microfibers) of the aqueous dispersion is preferably 50% by mass or less.

Examples of the dispersing machine used to prepare the dispersion include a pulper, a beater, a low pressure homogenizer, a high pressure homogenizer, a grinder, a cutter mill, a ball mill, a jet mill, a short-screw extruder, a twin-screw extruder, an ultrasonic agitator, and a household juicer-mixer.

Then, a predetermined amount of a surfactant is added to the aqueous dispersion. The aqueous dispersion is preferably stirred using, e.g., the above described dispersing machine during the addition. As previously discussed, the surfactant is chemically adsorbed to the surface of the cellulose microfibers in the aqueous dispersion, whereby the cellulose microfibers are hydrophobilized or rendered less hydrophilic to become the aforementioned cellulose composite microfibers (cellulose microfibers having a carboxyl group content of 0.1 to 3 mmol/g with a surfactant adsorbed thereon). On adding the surfactant to the aqueous dispersion, the produced cellulose composite microfibers usually settle, so that the aqueous dispersion, which is originally transparent, becomes white turbid. In some cases, nevertheless, addition of the surfactant to form the cellulose composite microfibers does not result in settlement and turbidity.

The aqueous dispersion to which the surfactant has been added is dewatered/concentrated to give cellulose composite microfibers of solid faint. The solid may be dried powder substantially free of water or may contain a small amount of water. The water content of the solid is preferably 90% by mass or less. Dewatering/concentration of the aqueous dispersion is carried out by, for example, filtration, centrifugation, dialysis, drying under reduced pressure, freeze-drying, spray-drying, or heat drying.

The cellulose composite microfibers of the aqueous dispersion may be washed with water after the surfactant addition and before the dewatering/concentration. Washing may be carried out by, for example, filtration, centrifugation, or dialysis.

The resulting cellulose composite microfibers of solid form are dispersed in a solvent containing an organic solvent. Specifically, a predetermined amount of a solvent containing an organic solvent is added to the solid, followed by treating the mixture in a dispersing machine, etc. The solvent containing an organic solvent is usually an organic solvent per se but, where desired, a mixture of an organic solvent and water may be used. The mass ratio of the organic solvent to water is as described above. There is thus obtained the cellulose microfiber dispersion of the invention, in which the cellulose composite microfibers are dispersed in an organic solvent.

The cellulose microfiber dispersion of the invention (second aspect) may also be prepared by, for example, a second method described below. The second method includes the step of adding a surfactant to a suspension (aqueous dispersion) of the reaction product fibers (oxidized natural cellulose fibers) before being microfibrillated, which is obtained by the above described method for producing cellulose microfibers having a carboxy content of 0.1 to 3 mmol/g, i.e., the method including the steps of oxidizing natural cellulose fibers to obtain reaction product fibers and microfibrillating the reaction product fibers. The second method further includes the steps of dewatering/concentrating the suspension containing the surfactant, dispersing and microfibrillating the resulting solid (reaction product fibers having the surfactant adsorbed thereon) in a predetermined amount of a solvent (an organic solvent or water), and dispersing the microfibrillated solid (cellulose composite microfibers) in a solvent containing an organic solvent.

The dispersibility of the cellulose composite microfibers in the cellulose microfiber dispersion of the invention is evaluated by the transparency and viscosity of the dispersion. The higher the transparency and/or the viscosity of the cellulose microfiber dispersion, the higher the dispersibility of the cellulose microfibers in the dispersion, indicating that the cellulose composite microfibers are stably dispersed in the dispersion.

The transparency of the cellulose microfiber dispersion is evaluated in terms of light transmittance. The higher the light transmittance, the higher the transparency of the dispersion, indicating that the cellulose microfibers are stably dispersed in the dispersion. The light transmittance of the cellulose microfiber dispersion of the invention is preferably 5% to 99.9%, more preferably 30% to 99.9%, even more preferably 50% to 99.5%. The light transmittance of the cellulose microfiber dispersion is determined using a UV/visible spectrophotometer (U-3310, from Hitachi High Technologies) with an optical path length of 1 cm at 660 nm.

The viscosity of the cellulose microfiber dispersion at 23° C. is preferably 1 to 10000 mP·s, more preferably 100 to 1000 mP·s. The viscosity of the cellulose microfiber dispersion is measured with a corn-plate viscometer (Visconic, from TOKIMEC) at 23° C. and 5 rpm.

The dispersibility (i.e., transparency and viscosity) of the cellulose composite microfibers in the cellulose microfiber dispersion is controllable by adjusting the content of the components of the dispersion. For example, an increase in cellulose composite microfiber content in the cellulose microfiber dispersion results in reduction of transparency (light transmittance) and increase of viscosity of the dispersion, whereas a decrease in the content results in increase of transparency (light transmittance) and reduction of viscosity of the dispersion.

The cellulose microfiber dispersion of the invention is suited to be compounded with plastic materials. It may be used as such (in the form of dispersion) or in the form of dried powder. The cellulose composite microfiber of powder form is obtained by removing the dispersing medium from the dispersion by drying or like treatment. As used herein the term "in powder form" means a powdered aggregate of cellulose composite microfibers but does not mean cellulose particles. Examples of the cellulose composite microfibers in powder form include a dried product obtained by drying the cellulose microfiber dispersion; powder obtained by mechanically processing the dried product; powder obtained by spray-drying the cellulose microfiber dispersion in a known manner; and powder obtained by freeze-drying the cellulose microfiber dispersion in a known manner. The spray-drying method as referred to above is a technique consisting of atomizing the cellulose microfiber dispersion in the air. The cellulose composite microfibers of powder form are especially useful as a filler of polymeric materials (resin composite materials), such as the composite material of the invention hereinafter described.

The composite material of the invention (second aspect) will then be described. The composite material of the invention is a mixture of the cellulose composite microfibers (cellulose microfibers with a carboxyl group content of 0.1 to 3 mmol/g having a surfactant adsorbed thereon) and a resin, namely, a resin composite material. The composite material of the invention is a system in which the cellulose composite microfibers and a resin are substantially uniformly dispersed throughout the composite material. Neither of the two components is substantially localized, nor is there a layer composed mainly of the cellulose composite microfibers or the resin.

The cellulose composite microfibers used as a component of the composite material of the invention may be in the form of a dispersion in an organic solvent (the aforementioned cellulose microfiber dispersion) or in the form of powder. In particular, the cellulose composite microfibers of powder form are dispersible uniformly (nanodispersible) in the composite material matrix (i.e., the resin used in the composite material in combination with the cellulose composite microfibers) so that sufficient mechanical strength for practical use is obtained with a relatively small amount of the cellulose composite microfibers, specifically 10% by mass or less in the composite material.

The resin used in combination with the cellulose composite microfibers in the composite material of the invention may be any moldable resin. As used herein, the term "moldable resin" means a resin that is, either alone or as mixed with other material(s), processable by necessary processing into a prescribed shape and able to retain that shape for at least a given period of time. For instance, fossil-derived resins useful in ordinary plastic molding are included in the term "moldable resin". The moldable resin is a material capable of being shaped into an article of prescribed shape through necessary processing (treatment for transforming the resin into a form different from its inherent form) and specifically includes those having thermoplasticity, those having thermosetting properties, those soluble in organic solvents, those dispersible in organic solvents, those soluble in water, and those dispersible in water. By the use of such a moldable resin, the composite material of the invention is moldable into thin shaped articles, such as films and sheets; three-dimensional containers, such as boxes and bottles; housings for information appliances; and bodies of cars and the like.

The resins for use in the invention (second aspect) include (a) biomass-derived polymers and (b) petroleum-derived polymers. The biomass-derived polymers are defined to be biological organic polymers except fossil resources and include those having biodegradability similarly to the cellulose microfibers. Examples of preferred biomass-derived polymers are polylactic acid (PLA), polyglycolic acid, poly (3-hydroxybutanoic acid), bio-polyethylene, bio-polypropylene, bio-polyethylene terephthalate, bio-polycarbonate, and other thermoplastic polymers. The petroleum-derived polymers are organic polymers obtained from fossil resources. Examples thereof include thermoplastic resins, such as polystyrene resins, nylon resins, methacrylic resins, acrylonitrile, butadiene, and styrene resins; and thermoplastic resins, such as epoxy resins, phenol resins, urea resins, and polyimide resins. These resins may be used either individually or in combination of two or more thereof.

The content of the cellulose composite microfibers in the composite material of the invention is decided as appropriate from the standpoint of the balance between mechanical strength and transparency. From the viewpoint of improvement on mechanical strength, it is generally preferred to increase the content of the cellulose composite microfibers, but too high a cellulose composite microfiber content can reduce transparency (the transparency essentially possessed by the resin used in combination with the cellulose composite microfibers in the composite material). In this regard the cellulose composite microfiber content in the composite material is preferably in the range of from 0.01% to 60%, more preferably 0.05% to 10%, even more preferably 0.1% to 5%, by mass relative to the total mass of the composite material.

The content of the resin in the composite material of the invention is preferably 40% to 99.99%, more preferably 90% to 99.95%, even more preferably 95% to 99.9%, by mass relative to the total mass of the composite material to secure high mechanical strength and transparency of the composite material.

If desired, the composite material of the invention may contain components other than the above described two components (the cellulose composite microfibers and the resin), for example, inorganic materials, such as clay minerals, inorganic substances, and metallic substances, typified by glass or concrete. These inorganic materials may be used individually or in combination of two or more thereof. The composite material of the invention may further contain additives, such as a softening agent and a nucleating agent.

The composite material of the invention is moldable into any shape and is provided as thin shaped articles, such as films and sheets, blocks, such as rectangular parallelepipeds and cubes, and other three-dimensional shaped articles. The thickness of, for example, a thin shaped article is not particularly limited but usually ranges from 0.05 to 50 mm.

The composite material of the invention (second aspect) is produced by, for example, mixing the cellulose composite microfibers and the resin to obtain a uniform mixture and molding the uniform mixture into a desired shape. That is, the method for producing the composite material of the invention includes the steps of mixing a dispersion of the cellulose composite microfibers in an organic solvent or the cellulose composite microfibers in powder form with the resin to obtain a uniform mixture and molding the uniform mixture into a desired shape. For example, the composite material of the invention is produced by a method called melt kneading including the steps of adding the composite microfiber dispersion or the cellulose composite microfibers in powder form to the resin in a heated molten state, kneading the mixture while the resin maintains the molten state, and molding the resulting uniform mixture. A known kneading machine may be used, such as a single-screw compounding extruder, a twin-screw compounding extruder, and a pressure kneader.

More specifically, when in using, for example, a thermoplastic resin, such as polylactic acid, as the resin, the composite dispersion or the cellulose composite microfibers of powder form is/are added to the thermoplastic resin in a molten state and uniformly dispersed in the resin using a twin-screw compounding extruder to obtain resin pellets. The resin pellets may be compressed under heating to make a composite material of sheet form or molded into a composite material of block or other three dimensional shapes by known plastic molding techniques, such as injection molding, cast molding, extrusion, blow molding, stretch molding, and expansion molding.

Flow casting is another method for producing the composite material. Flow casting is a method including the steps of providing a fluid mixture by dispersing or dissolving the cellulose composite microfibers and the resin in a solvent, casting the mixture on a substrate, and removing the solvent to form a composite material of thin film form. The cast film may be subjected to hot-pressing, if desired. For example, the fluid mixture may be prepared by adding the composite dispersion or the cellulose composite microfibers of powder form to a solution of the resin in an organic solvent, and the resulting fluid mixture is cast to obtain a composite material of film or sheet form.

In the flow casting method, removal of the solvent from a fluid mixture cast on a substrate is accomplished by, for example, use of a liquid permeable substrate, such as a porous substrate having a number of openings penetrating the thickness thereof through which a liquid is allowed to pass. In this method, on applying the fluid mixture to the liquid permeable substrate, the solvent of the fluid mixture passes through the porous substrate to leave the solid matter (the cellulose composite microfibers and the resin) on the porous substrate. Another method for the solvent removal is to dry the fluid mixture cast on a substrate spontaneously or by application of heat, e.g., hot air. The hot pressing that may be conducted on the film obtained after solvent removal in the casting method is achieved using a known apparatus, such as a metallic platen or rotary hot press.

It is preferred for the composite material of the invention (second aspect) to have sufficient mechanical strength for practical use. More specifically, the composite material of the invention preferably has a tensile modulus and a tensile yield strength both at least 1.1 times, more preferably 1.3 or more times, even more preferably 1.5 or more times, those of the base polymer. As used herein, the term "base polymer" denotes the resin used in the invention in combination with the cellulose composite microfibers. The composite material obtained by any of the aforementioned methods has a tensile modulus and a tensile yield strength falling within the respective ranges recited above, namely sufficient mechanical strength for practical use. Tensile modulus and tensile yield strength are determined by the following methods.

Method for Measuring Tensile Modulus and Tensile Yield Strength:

Method A or B described below is followed. In Examples and Comparative Examples hereinafter given, method A was adopted in Examples B1 to B11 and Comparative Examples B1 to B5, while method B was used in Examples B12 through B17 and Comparative Example B6.

Method A:

Tensile modulus and tensile yield strength are measured by a tensile test using a tensile-compression tester RTA-500 (from Orientech Co., Ltd.) in accordance with JIS K7113. A JIS No. 3 dumbbell specimen punched out of a composite material is set on the tester at an initial jaw separation of 80 mm and pulled at a cross head speed of 10 mm/min.

Method B:

Tensile modulus and tensile yield strength of the composite material are measured by a tensile test using a tensile-compression tester Tensilon TUC-100 (from Orientech Co., Ltd.) in accordance with JIS K7113. A JIS No. 2 dumbbell specimen punched out of a composite material is set on the tester at an initial jaw separation of 40 mm and pulled at a cross head speed of 50 mm/min.

The invention (second aspect) allows for the provision of a highly transparent composite material. When combined with polylactic acid, in particular, as a resin, the cellulose composite microfibers secure high mechanical strength in the composite material at a relative low content (5 mass % or less) so that a composite material with practically sufficient mechanical strength is obtained without substantially impairing the high transparency inherent to polylactic acid. When the composite material is shaped into a sheet with a thickness of about 0.5 mm, the term "high transparency" as used herein is intended to mean a total light transmittance level of 50% or more, preferably 80% or more, or a haze of 50% or less, preferably 30% or less, of the sheet. The total light transmittance and the haze of the composite material are measured as follows.

Method for Measuring Total Light Transmittance and Haze of Composite Material:

The total light transmittance and the haze of the composite material are measured in accordance with JIS K7361-1 and JIS K7105, respectively, using a commercially available hazemeter. In evaluating the samples (composite materials) of Examples and Comparative Examples hereinafter given, NDH5000 (from Nippon Denshoku Industries) was used in Examples B1 through B11 and Comparative Examples B1 to B5, and HM-150 (from Murakami Color Research Laboratory) was used in Examples B12 to B17 and Comparative Example B6 as a hazemeter.

EXAMPLES

The invention (first aspect) will now be illustrated in detail with reference to Examples. It should be understood, nevertheless, that the scope of the invention is not limited thereto. The numbers of Examples and Comparative Examples relating to the first aspect of the invention are headed by the letter "A".

A suspension of cellulose microfibers 1 was prepared as cellulose microfibers discussed above (method for making cellulose microfibers 1):

Materials used were (1) softwood bleached kraft pulp (from Fletcher Challenge Canada Ltd.; CSF: 650 ml) as natural cellulose fiber, (2) TEMPO (from Aldrich; free radical: 98%) as a catalyst for oxidation, (3) sodium hypochlorite (from Wako Pure Chemical Industries, Ltd.; Cl: 5%) as an oxidizer, and (4) sodium bromide (from Wako Pure Chemical Industries, Ltd.) as a re-oxidizer. The natural cellulose fibers weighing 100 g were thoroughly stirred in 9900 g of ion exchanged water to obtain slurry. To the resulting slurry were added 1.25% of TEMPO, 12.5% of sodium bromide, and 28.4% of sodium hypochlorite in that order, each relative to the mass of the pulp. The pulp was oxidized at 20° to 0° C. while keeping the pH of the slurry at 10.5 by dropping 0.5 M sodium hydroxide using a pH-stat. After 120 minutes reacting, dropping of sodium hydroxide was stopped to provide reaction product fibers (oxidized pulp). The reaction product fibers were sufficiently washed with ion exchanged water and dewatered. A 10 g (on solid basis) portion of the reaction product fibers and 990 g of ion-exchanged water were stirred in a mixer (Vita-Mix blender ABSOLUTE, available from Osaka Chemical Co., Ltd.) for 120 minutes (microfibrillation time: 120 minutes) to provide a suspension of cellulose microfibers 1 having an average fiber diameter of 3.1 nm and a carboxyl group content of 1.3 mmol/g. The solid concentration of the suspension was 1.0 mass %.

The suspension of the cellulose microfibers 1 was poured into an aqueous ethanol solution to cause the fibers to agglomerate or flocculate. The agglomerate was washed with acetone to obtain powdered (particulate) cellulose microfibers (designated cellulose nanofiber powder 1). Separately, the suspension of the cellulose microfibers 1 was spray-dried to obtain cellulose nanofiber powder 2. The spray-drying was carried out by using a spray drier B-290 from Nihon BUCHI under the following conditions: Nozzle cap diameter 1.5 mm, inlet temperature 200° C., outlet temperature 96° C., and spray flow 40 mm. To the suspension of cellulose microfibers 1 was added a 1 M hydrochloric acid aqueous solution in an amount of 2 chemical equivalents to the carboxyl groups of the cellulose microfibers in the suspension, followed by stirring for 60 minutes to cause the fiber to agglomerate. The resulting agglomerate was washed with acetone to give powdered (particulate) cellulose nanofiber powder 3. As a result of the treatment with hydrochloric acid, the carboxyl group of the cellulose unit constituting cellulose microfibers 1 was changed from sodium salt form to acid form so that the resulting cellulose nanofiber powder 3 possesses carboxyl groups of acid form (COOH).

Example A1

Cellulose nanofiber powder 1 was processed by the above described melt kneading method to make a composite material of sheet form, which was used as a sample of Example A1.

A kneading machine (Laboplastomill, from Toyo Seiki Seisakusho, Ltd.) was charged successively with 50 g of PLA (NW4032D, from Nature Works LLC) as a moldable polymeric material (biomass-derived polymer), 5 g of di(methyl triglycol) succinate ((MeEO3)2SA, from Kao Corp.), and 0.1 g of cellulose nanofiber powder 1, followed by kneading at 180° C. and 50 rpm for 10 minutes to obtain a uniform mixture. The uniform mixture was set on a press (Labopress, from Tokyo Seiki Seisakusho), hot-pressed at 180° C. first under a low pressure (5 kg/cm$^2$) for 3 minutes and then under a high pressure (200 kg/cm$^2$) for 1 minute and then cold-pressed at 20° C. under a low pressure (5 kg/cm$^2$) for 3 minutes and then under a high pressure (200 kg/cm$^2$) for 1 minute to provide a composite material of sheet form with a thickness of about 0.5 mm.

Example A2

A composite material of sheet form was made in the same manner as in Example A1, except for replacing cellulose nanofiber powder 1 with cellulose nanofiber powder 2. The resulting composite material was used as a sample of Example A2.

Example A3

A composite material of sheet form was made in the same manner as in Example A2, except for changing the amount of cellulose nanofiber powder 2 to 1.0 g so as to change the cellulose microfiber content in the composite material as shown in Table below. The resulting composite material was used as a sample of Example A3.

Example A4

A composite material of sheet form was made in the same manner as in Example A3, except for using 37.5 g of polyethylene, which is a petroleum-derived polymer, as a polymeric material and changing the amount of cellulose nanofiber powder 2 to 0.8 g so as to change the cellulose microfiber content in the composite material as shown in Table below. The resulting composite material was used as a sample of Example A4. The polyethylene used in Example A4 was a mixture of 30 g of first polyethylene (Novatec HD HB333RE, from Japan Polyethylene Corp.) and 7.5 g of second polyethylene (ADMER SF730, from Mitsui Chemicals, Inc.).

Example A5

A composite material of sheet form was made in the same manner as in Example A4, except for changing the amount of cellulose nanofiber powder 2 to 2.0 g so as to change the cellulose microfiber content in the composite material as shown in Table below. The resulting composite material was used as a sample of Example A5.

Example A6

To 300 g of a slurry of 1.5 g of cellulose microfibers 1 in water was added 3 g of softwood bleached kraft pulp (from Fletcher Challenge Canada Ltd.; CSF: 650 ml), which is a polysaccharide, as a polymeric material (biomass-derived polymer), and the mixture was stirred in a mixer (Vita-Mix blender ABSOLUTE, from Osaka Chemical Co., Ltd.) for 10 minutes to prepare a uniform mixture. The uniform mixture was cast on a tray and dried spontaneously to form a composite material of sheet form, which was used as a sample of Example A6.

Example A7

Modified polyethylene (DHO200, from Japan Polyethylene Corp.), which is a petroleum-derived polymer (modified resin), and cellulose nanofiber powder 2 were compounded by melt kneading at a ratio of 90/10 to obtain pellets. Three grams of the pellets and 27 g of polyethylene (Novatec HD HB333RE, from Japan Polyethylene Corp.) as another petroleum-derived polymer were compounded in a kneading machine and pressed in the same manner as in Example A1 to obtain a composite material of sheet form, which was used as a sample of Example A7.

Example A8

Cellulose nanofiber powder 3 (0.1 g) was added to 10 g of di(methyl triglycol) succinate ((MeEO3)A1010, synthesized by referring to JP 2007-16092A) as a softening agent, followed by stirring to prepare a semitransparent dispersion. A kneading machine (Laboplastmill, from Toyo Seiki Seisakusho, Ltd.) was charged successively with 50 g of PLA (NW4032D, from Nature Works) as a biomass-derived polymer, 0.15 g of ethylenebis-12-hydroxystearamide (Slipax H, from Nippon Kasei Chemical Co., Ltd.) as a nucleating agent, and 5 g of the above prepared semitransparent dispersion, followed by kneading at 180° C. and 50 rpm for 10 minutes to obtain a uniform mixture. The uniform mixture was set on a press (Labopress, from Tokyo Seiki Seisakusho), hot-pressed at 180° C. first under a low pressure (5 kg/cm$^2$) for 3 minutes and then under a high pressure (200 kg/cm$^2$) for 1 minute and then cold-pressed at 20° C. under a low pressure (5 kg/cm$^2$) for 3 minutes and then under a high pressure (200 kg/cm$^2$) for 1 minute to provide a composite material of sheet form with a thickness of about 0.4 mm.

Example A9

A composite material of sheet form was made in the same manner as in Example A8, except for changing the amount of cellulose nanofiber powder 3 to 0.5 g so as to change the cellulose microfiber content in the composite material as shown in Table below. The resulting composite material was used as a sample of Example A9.

Example A10

A composite material of sheet form was made in the same manner as in Example A8, except for changing the amount of cellulose nanofiber powder 3 to 1.0 g so as to change the cellulose microfiber content in the composite material as shown in Table below. The resulting composite material was used as a sample of Example A10.

Comparative Example A1

A composite material of sheet form was made in the same manner as in Example A1, except that cellulose nanofiber powder 1 was not added. The resulting composite material was used as a sample of Comparative Example A1. The sample of Comparative Example A1 is a cellulose microfiber-free molded article composed mainly of the base polymer (PLA) used in the composite materials of Examples A1 to A3.

Comparative Example A2

A composite material of sheet form was made in the same manner as in Example A2, except for replacing cellulose nanofiber powder 2 with cellulose microfibrils (Celish FD-200L, from Daicel Chemical Industries, Ltd.; carboxyl group content: 0.05 mmol/g). The resulting composite material was used as a sample of Comparative Example A2.

Comparative Example A3

A composite material of sheet form was made in the same manner as in Comparative Example A2, except for changing the amount of the cellulose microfibrils so as to change the cellulose microfibrils content in the composite material as shown in Table below. The resulting composite material was used as a sample of Comparative Example A3.

Comparative Example A4

A composite material of sheet form was made in the same manner as in Example A2, except for replacing cellulose nanofiber powder 2 with microcrystalline cellulose (KC Flock W-200G, from Nippon Paper Chemicals Co., Ltd.; carboxyl group content: 0.05 mmol/g). The resulting composite material was used as a sample of Comparative Example A4.

Comparative Example A5

A composite material of sheet form was made in the same manner as in Comparative Example A4, except for changing the amount of the microcrystalline cellulose so as to change the microcrystalline cellulose content as shown in Table. The resulting composite material was used as a sample of Comparative Example A5.

Comparative Example A6

A composite material of sheet form was made in the same manner as in Example A4, except that cellulose nanofiber powder 2 was not added. The resulting composite material was used as a sample of Comparative Example A6. The sample of Comparative Example A6 is a molded article containing no cellulose microfibers but is composed mainly of the base polymer (PE) used in the composite materials of Examples A4 and A5.

Comparative Example A7

A composite material of sheet form was made in the same manner as in Example A6, except for replacing the cellulose microfibers 1 with cellulose microfibrils (Celish FD-200L, from Daicel Chemical Industries, Ltd.; carboxyl group content: 0.05 mmol/g). The resulting composite material was used as a sample of Comparative Example A7.

Comparative Example A8

A composite material of sheet form was made in the same manner as in Example A7, except that cellulose nanofiber powder 2 was not added. The resulting composite material was used as a sample of Comparative Example A8. The sample of Comparative Example A8 is a molded article containing no cellulose microfibers but is composed mainly of the base polymer (PE) used in the composite material of Example A7.

Comparative Example A9

A composite material of sheet form was made in the same manner as in Example A8, except that cellulose nanofiber powder 3 was not added. The resulting composite material was used as a sample of Comparative Example A9. The sample of Comparative Example A9 is a molded article containing no cellulose microfibers but is composed mainly of the base polymer (PLA) used in the composite materials of Examples A8 to A10.

EVALUATION

The samples (composite materials) of Examples and Comparative Examples were evaluated for tensile modulus, tensile yield strength, and total light transmittance by the methods described supra. The thickness of each sample was measured with no load applied thereon. The results obtained are shown in Tables 1 and 2 below, in which "microfibers" means cellulose fibers having an average diameter of 200 nm or smaller and a carboxyl group content of 0.1 to 2 mmol/g.

TABLE 1

| | | Method of Making Composite Material | Cellulose Fiber | | | | | |
|---|---|---|---|---|---|---|---|---|
| | | | Kind | Content (mass %) | Avg. Fiber Diameter (nm) | Carboxyl Group Content (mmol/g) | Carboxyl Group Kind | Avg. Aspect Ratio |
| Example | A1 | melt kneading | microfibers | 0.20 | 3.1 | 1.3 | COONa | 240 |
| | A2 | melt kneading | microfibers | 0.20 | 3.1 | 1.3 | COONa | 240 |
| | A3 | melt kneading | microfibers | 1.80 | 3.1 | 1.3 | COONa | 240 |
| | A6 | flow casting | microfibers | 50 | 3.1 | 1.3 | COONa | 240 |
| | A8 | melt kneading | microfibers | 0.01 | 3.1 | 1.3 | COOH | 240 |
| | A9 | melt kneading | microfibers | 0.05 | 3.1 | 1.3 | COOH | 240 |
| | A10 | melt kneading | microfibers | 0.10 | 3.1 | 1.3 | COOH | 240 |
| Comparative Example | A1 | melt kneading | — | 0.00 | — | — | — | — |
| | A2 | melt kneading | microfibrils | 0.20 | 10-100 | <0.1 | COONa | — |
| | A3 | melt kneading | microfibrils | 1.80 | 10-100 | <0.1 | COONa | — |
| | A4 | melt kneading | microcrystallites | 0.20 | 17000 | <0.1 | COONa | — |
| | A5 | melt kneading | microcrystallites | 1.80 | 17000 | <0.1 | COONa | — |
| | A7 | flow casting | microfibrils | 50 | 10-1000 | <0.1 | — | — |
| | A9 | melt kneading | — | 0.00 | — | — | — | — |

TABLE 1-continued

|  |  | | Biomass-derived Polymer | | Tensile Modulus (GPa) | Tensile Yield Strength (MPa) | Total Transmittance (%) | Thickness (μm) |
|---|---|---|---|---|---|---|---|---|
|  |  | | Kind | Content (mass %) | | | | |
| Example | | A1 | PLA | 90.7 | 2.63 | 47.0 | 90 | 0.60 |
|  | | A2 | PLA | 90.7 | 2.74 | 43.0 | 89 | 0.53 |
|  | | A3 | PLA | 89.3 | 2.57 | 40.3 | 79 | 0.53 |
|  | | A6 | pulp | 50.0 | 1.82 | 44.3 | 81 | 0.70 |
|  | | A8 | PLA | 90.7 | 1.30 | 37.0 | 91 | 0.40 |
|  | | A9 | PLA | 90.6 | 1.40 | 38.0 | 91 | 0.40 |
|  | | A10 | PLA | 90.6 | 1.40 | 37.0 | 90 | 0.40 |
| Comparative Example | | A1 | PLA | 90.9 | 2.06 | 26.9 | 90 | 0.53 |
|  | | A2 | PLA | 90.7 | 2.02 | 28.7 | 91 | 0.50 |
|  | | A3 | PLA | 89.3 | 2.15 | 30.6 | 90 | 0.52 |
|  | | A4 | PLA | 90.7 | 1.22 | 15.8 | 90 | 0.50 |
|  | | A5 | PLA | 89.3 | 2.43 | 38.6 | 90 | 0.52 |
|  | | A7 | pulp | 50.0 | 1.27 | 20.2 | 30 | 0.70 |
|  | | A9 | PLA | 90.7 | 1.00 | 31.0 | 91 | 0.40 |

TABLE 2

|  |  | Method of Making Composite Material | Cellulose Fiber | | | | |
|---|---|---|---|---|---|---|---|
|  |  | | Kind | Content (mass %) | Avg. Fiber Diameter (nm) | Carboxyl Group Content (mmol/g) | Kind | Avg. Aspect Ratio |
| Example | A4 | melt kneading | microfibers | 2.1 | 3.1 | 1.3 | COONa | 240 |
|  | A5 | melt kneading | microfibers | 5.1 | 3.1 | 1.3 | COONa | 240 |
|  | A7 | melt kneading | microfibers | 1.0 | 3.1 | 1.3 | COONa | 240 |
| Comp. Example | A6 | melt kneading | — | 0.0 | — | — | — | — |
|  | A8 | melt kneading | — | 0.0 | — | — | — | — |

|  |  | Petroleum-derived Polymer | | | | Tensile Modulus (GPa) | Tensile Yield Strength (MPa) | Total Transmittance (%) | Thickness (μm) |
|---|---|---|---|---|---|---|---|---|---|
|  |  | Kind | Content (mass %) | Kind | Content (mass %) | | | | |
| Example | A4 | PE | 97.9 | — | — | 0.73 | 16.1 | 60 | 0.55 |
|  | A5 | PE | 94.9 | — | — | 0.80 | 16.7 | 24 | 0.57 |
|  | A7 | PE | 90.0 | modified PE | 9.0 | 1.10 | 20.8 | 65 | 0.59 |
| Comp. Example | A6 | PE | 100.0 | — | — | 0.63 | 14.4 | 73 | 0.54 |
|  | A8 | PE | 90.9 | modified PE | 9.1 | 0.97 | 20.4 | 70 | 0.57 |

As is apparent from the results in Table 1, each of the composite materials of Examples A1 to A3 containing PLA, a biomass-derived polymer, as a base polymer exhibits sufficient mechanical strength for practical use, specifically 1.2 or more times both the tensile modulus and the tensile yield strength of the base polymer (Comparative Example A1) and also has high transparency as proved by the total light transmittance of 70% or higher. The composite materials of Examples A8 to A10, which use cellulose microfibers having a carboxyl group of acid form, exhibit 1.2 or more times the tensile modulus and tensile yield strength of the base polymer (Comparative Example A9) with an extremely small cellulose microfiber content of 1 mass % or less.

It is also apparent from the results in Table 1 that the composite material of Example A6, which contains pulp (polysaccharide) as a base polymer and is made by flow casting, shows a higher tensile modulus and a higher tensile yield strength than the composite material of Comparative Example A7, which was made in the same manner as in Example 6A except for using known cellulose microfibrils in place of the cellulose microfibers, and also has high transparency as demonstrated by the total light transmittance of 70% or higher.

It is apparent from the results in Table 2 that the composite materials of Examples A4 and A5 containing PE (petroleum-derived polymer) as a base polymer also exhibit 1.1 or more times both the tensile modulus and the tensile yield strength of the base polymer (Comparative Example A6). In particular, the composite material of Example A7, which was obtained by first preparing pellets of a petroleum-derived modified resin containing the cellulose microfibers by melt-kneading, then melt-kneading the pellets with the base polymer (PE), and shaping the mixture into a sheet, exhibits 1.1 or more times the tensile modulus of the base polymer (Comparative Example A8) notwithstanding such a small cellulose microfiber content of 1 mass %.

In contrast, all the composite materials of Comparative Examples A1, A6, A8, and A9, which do not contain the cellulose microfibers, are inferior in mechanical strength to those of Examples. Furthermore, the composite materials of Comparative Examples A2 to A5, which contain conventionally known cellulose microfibrils or microcrystalline cellulose in place of the cellulose microfibers, achieve smaller effects on mechanical strength than those of Examples, as is suggested by visually observable agglomerates of the cellulose microfibrils or microcrystalline cellulose in the composite materials.

The results of Examples A1 to A3 and A8 to A10, in which PLA is used as a moldable polymeric material (biomass-derived polymer), prove that tensile modulus and tensile yield strength of the base polymer are greatly improved by combining with a relatively small amount (5 mass % or less) of the cellulose microfibers having an average fiber diameter preferably of 200 nm or less and a carboxyl group content of 0.1 to 3 mmol/g. The improving effects are considered attributed partly to the dispersibility of the cellulose microfibers and partly to the high interfacial strength due to the strong interaction between the functional groups (carboxyl groups and hydroxyl groups) of PLA and the carboxyl groups and hydroxyl groups on the surface of the cellulose microfibers. Because of such a small cellulose microfiber content, reduction in light transmittance of the PLA resin inherently possessing high transparency (high light transmittance) is minimized, and the composite materials of Examples A1 to A3 and A8 to A10 retain the high transparency inherent to the PLA resin. This suggests that the cellulose microfibers are nano-dispersed in the resin, though not observable by the state-of-the-art nanoanalysis technology.

The invention (second aspect) will then be illustrated in detail with reference to Examples. It should be understood, nevertheless, that the scope of the invention is not limited thereto. The numbers of Examples and Comparative Examples relating to the second aspect of the invention are headed by the letter "B".

Example B1

A cellulose microfiber dispersion (a composite dispersion as referred to above) was prepared by the method below which is in accordance with the second method described supra. The resulting cellulose microfiber dispersion was used as a sample of Example B1.

Materials used were (1) softwood bleached kraft pulp (from Fletcher Challenge Canada Ltd.; CSF: 650 ml) as natural cellulose fiber, (2) TEMPO (from Aldrich; free radical: 98%) as a catalyst for oxidation, (3) sodium hypochlorite (from Wako Pure Chemical Industries, Ltd.; Cl: 5%) as an oxidizer, and (4) sodium bromide (from Wako Pure Chemical Industries, Ltd.) as a re-oxidizer. The natural cellulose fibers weighing 100 g were stirred thoroughly in 9900 g of ion exchanged water to obtain slurry. To the resulting slurry were added 1.25% of TEMPO, 14.2% of sodium bromide, and 28.4% of sodium hypochlorite in that order, each relative to the mass of the pulp. The pulp was oxidized at 20° while keeping the pH of the slurry at 10.5 by dropping 0.5 M sodium hydroxide using a pH-stat. After 120 minutes reacting, dropping of sodium hydroxide was stopped. The reaction product was sufficiently washed with ion exchanged water and dewatered to give reaction product fibers (oxidized pulp).

The reaction product fibers were dispersed in ion exchanged water to prepare an aqueous dispersion having a solid concentration of 1 mass %. The aqueous dispersion (300 g) was subjected to microfibrillation treatment in a mixer (Vita-Mix blender ABSOLUTE, available from Osaka Chemical Co., Ltd.) for 10 minutes to give cellulose microfibers. The average diameter and carboxyl group content of the resulting cellulose microfibers were determined by the methods described supra. The results obtained are shown in Table 3. The average diameter and carboxyl group content of the cellulose microfibers thus prepared were substantially equal to those of cellulose composite microfibers obtained by the steps below.

Two grams (on solid basis) of the reaction product fibers and 400 g of ion exchanged water were mixed, and 10.8 g of 10% tetrabutylammonium hydroxide (TBAH) (from Wako Pure Chemical) as a surfactant was added thereto. The mixture was stirred for 24 hours and filtered through a glass filter. The collected solid was washed with ion exchanged water and then with acetone to give cellulose composite microfibers.

The solvent was removed from the resulting cellulose composite microfibers to a solid concentration of about 30%. A 0.4 g (on solid basis) portion of the cellulose composite microfibers and 20 g of di(methyl triglycol) succinate ((MeEO3) A1010, synthesized by referring to JP 2007-16092A) as a softening agent (dispersing medium) were mixed and stirred in an ultrasonic device (UP200H, from Hielscher) for 3 minutes. This stirring operation corresponds to the microfibrillation treatment in the second method described above. There was thus obtained a cellulose microfiber dispersion (solid concentration: 2 mass %) containing the cellulose composite microfibers and the organic solvent, which was used as a sample of Example B1.

Example B2

A cellulose microfiber dispersion (solid concentration: 1 mass %) was prepared in the same manner as in Example B1, except for changing the amount of the cellulose composite fibers to 0.2 g (on solid basis) so as to change the cellulose composite microfiber content in the cellulose microfiber dispersion as shown in Table 3. The resulting dispersion was used as a sample of Example B2.

Example B3

A cellulose microfiber dispersion (solid concentration: 2 mass %) was prepared in the same manner as in Example B1, except for replacing TBAH with 6.0 g of 10% tetraethylammonium hydroxide (TEAH) (from Wako Pure Chemical) as a surfactant. The resulting dispersion was used as a sample of Example B3.

Example B4

A cellulose microfiber dispersion (solid concentration: 1 mass %) was prepared in the same manner as in Example B3, except for changing the amount of the cellulose composite microfibers to 0.2 g (on solid basis) so as to change the cellulose composite microfiber content in the cellulose microfiber dispersion as shown in Table 3. The resulting dispersion was used as a sample of Example B4.

Example B5

A cellulose fiber dispersion (solid concentration: 1 mass %) was prepared in the same manner as in Example B2, except for replacing TBAH with 3.2 g of distearyldimethylammonium chloride (Kotamin D86P, from Kao Corp.) as a surfactant. The resulting dispersion was used as a sample of Example B5.

Example B6

A cellulose microfiber dispersion (a composite dispersion as referred to above) was prepared by the method below which is based on the first method described supra. The resulting cellulose microfiber dispersion was used as a sample of Example B6.

The reaction product fibers were dispersed in ion exchanged water to prepare an aqueous dispersion having a solid concentration of 1 mass %. The aqueous dispersion (300 g) was subjected to microfibrillation treatment in a mixer (Vita-Mix blender ABSOLUTE, available from Osaka Chemical Co., Ltd.) for 120 minutes to prepare a cellulose microfiber suspension. To the suspension was added 80 g of a 5 mass % aqueous solution (adjusted to pH 4.5 with hydrochloric acid) of octylamine (Farmin 08D, from Kao Corp.) in ion exchanged water, followed by stirring for 24 hours. The mixture was centrifuged, and the solid was thoroughly washed with ion exchanged water and then with acetone to provide cellulose composite microfibers.

The resulting cellulose composite microfibers weighing 0.4 g on solid basis and 100 g of a 70/30 mixture of ethanol/ion exchanged water were mixed. The mixture was stirred in an ultrasonic device (UP200H, from Hielscher) for 1 minute to prepare a cellulose microfiber dispersion (solid concentration: 0.4 mass %), which was used as a sample of Example B6.

Example B7

A cellulose microfiber dispersion (solid concentration: 0.4 mass %) was prepared in the same manner as in Example B6, except for replacing the ethanol/water mixed solvent with a 30/60/10 mixture of ethanol, DMF, and water. The resulting dispersion was used as a sample of Example B7.

Comparative Example B1

A cellulose microfiber dispersion was prepared as a sample of Comparative Example B1 in the same manner as in Example B1, except for using no surfactant.

Comparative Example B2

A cellulose microfiber dispersion was prepared as a sample of Comparative Example B2 in the same manner as in Example B2, except for using no surfactant.

Comparative Example B3

A cellulose fiber dispersion was prepared as a sample of Comparative Example B3 in the same manner as in Comparative Example B1, except that the oxidation step (the step of oxidizing natural cellulose fibers to obtain reaction product fibers) was not carried out. Because of the omission of the oxidation step, the cellulose fibers in the resulting cellulose fiber dispersion are different from the cellulose microfibers having a carboxyl group content of 0.1 to 3 mmol/g. The cellulose fibers will also be referred to as cellulose non-micro fibers.

Comparative Example B4

A cellulose microfiber dispersion was prepared in the same manner as in Example B6, except for using no surfactant. The resulting dispersion was used as a sample of Comparative. Example B4.

Evaluation 1

The samples (cellulose fiber dispersions) of Examples and Comparative Examples were evaluated for light transmittance and viscosity by the methods previously described. The results obtained are shown in Table 3.

TABLE 3

| | | | Dispersion | | | | | |
|---|---|---|---|---|---|---|---|---|
| | | | Cellulose Fiber | | | | | |
| | | Kind | Content (mass %) | Average Diameter (nm) | Carboxyl group content (mmol/g) | Surfactant | Softening Agent (dispersing medium) | Transmittance (%) | Viscosity (mP·s) |
| Example | B1 | composite microfibers*1 | 2.0 | 3.3 | 1.2 | TBAH | di(methyl triglycol) succinate | 45 | 1229 |
| | B2 | composite microfibers | 1.0 | 3.3 | 1.2 | TBAH | di(methyl triglycol) succinate | 63 | 154 |
| | B3 | composite microfibers | 2.0 | 3.3 | 1.2 | TEAH | di(methyl triglycol) succinate | 43 | 922 |
| | B4 | composite microfibers | 1.0 | 3.3 | 1.2 | TEAH | di(methyl triglycol) succinate | 63 | 154 |
| | B5 | composite microfibers | 1.0 | 3.3 | 1.2 | Kotamin D86P*3 | di(methyl triglycol) succinate | 23 | 154 |
| | B6 | composite microfibers | 0.4 | 3.1 | 1.2 | Farmin 08D*4 | ethanol/water | 52 | 410 |
| | B7 | composite microfibers | 0.4 | 3.1 | 1.2 | Farmin 08D | ethanol/DMF/water | 43 | 410 |
| Compara. Example | B1 | — | 2.0 | — | 1.2 | — | di(methyl triglycol) succinate | 0 | N.D. |
| | B2 | — | 1.0 | — | 1.2 | — | di(methyl triglycol) succinate | 0 | N.D. |

TABLE 3-continued

| | | Dispersion | | | | | | |
|---|---|---|---|---|---|---|---|---|
| | | Cellulose Fiber | | | | | | |
| | Kind | Content (mass %) | Average Diameter (nm) | Carboxyl group content (mmol/g) | Surfactant | Softening Agent (dispersing medium) | Transmittance (%) | Viscosity (mP · s) |
| B3 | non-micro fibers*2 | 2.0 | — | 0.05 | — | di(methyl triglycol) succinate | 0 | N.D. |
| B4 | | 0.4 | 3.1 | 1.2 | — | ethanol/water | 40 | 0 |

Note:
*[1]Cellulose microfibers with a carboxyl group content of 0.1 to 3 mmol/g having a surfactant adsorbed thereon.
*[2]Different from the cellulose microfibers with a carboxyl group content of 0.1 to 3 mmol/g.
*[3]Distearyldimethylammonium chloride (cationic surfactant available from Kao Corp.).
*[4]Octylamine (cationic surfactant available from Kao Corp.).

Examples B1 to B5 and Comparative Examples B1 to B3 are cellulose fiber dispersions prepared by the method based on the above described second method. As is apparent from the results in Table 3, Examples B1 to B5, which contain cellulose composite fibers composed of cellulose microfibers with a carboxyl group content of 0.1 to 3 mmol/g having a surfactant adsorbed thereon, exhibit high light transmittance (transparency) and viscosity, proving to be a cellulose composite microfiber dispersion having good dispersibility. Making comparison between dispersions having a cellulose fiber content of 1 mass %, Examples B2 and B4 using, as a surfactant, TBAH (number of carbon atoms: 4) and TEAH (number of carbon atoms: 2), both of which are quaternary ammonium compounds, respectively, exhibit high transparency as demonstrated by a light transmittance of 50% or more and high dispersibility. On the other hand, Comparative Examples B1 and B2, which were prepared without using a surfactant, and Comparative Example B3, which contains cellulose fibers having a carboxyl group content of less than 0.1 mmol/g, have a light transmittance of 0% (poor transparency) and low dispersibility. The viscosity of the dispersions of Comparative Examples B1 to B3 was unmeasurable because the cellulose fibers flocculated to become completely separated, non-dispersed flocks.

Examples B6 and B7 and Comparative Example B4 are the cellulose microfiber dispersions prepared by the method based on the above described first method. As is apparent from the results in Table 3, Example B6 wherein an ethanol/water mixed solvent is used as a dispersing medium has a high light transmittance, indicating high transparency. In contract, Comparative Example B4 lacks dispersibility of the cellulose microfibers due to the absence of a surfactant. That is, the cellulose microfibers flocculate in the dispersing medium (ethanol/water mixed solvent), resulting in lower light transmittance and viscosity than those of Example B6.

Example B8

The cellulose microfiber dispersion of Example B1 was processed by the above discussed melt kneading method to make a composite material of sheet form, which was used as a sample of Example B8. A kneading machine (Laboplastomill from Toyo Seiki Seisakusho, Ltd.) was charged successively with 50 g of PLA (NW4032D, from Nature Works LLC) as a moldable resin and 5 g of the cellulose microfiber dispersion of Example B1, followed by kneading at 180° C. and 50 rpm for 10 minutes to obtain a uniform mixture. The uniform mixture was set on a press (Labopress, from Tokyo Seiki Seisakusho), hot-pressed at 180° C. first under a low pressure (5 kg/cm$^2$) for 3 minutes and then under a high pressure (200 kg/cm$^2$) for 1 minute and then cold-pressed at 20° C. under a low pressure (5 kg/cm$^2$) for 3 minutes and then under a high pressure (200 kg/cm$^2$) for 1 minute to provide a composite material of sheet form with a thickness of about 0.5 mm.

Example B9

A composite material of sheet form was made in the same manner as in Example B8, except for replacing the cellulose microfiber dispersion of Example B1 with that of Example B2. The resulting composite material was used as a sample of Example B9.

Example B10

A composite material of sheet form was made in the same manner as in Example B8, except for replacing the cellulose microfiber dispersion of Example B1 with that of Example B4. The resulting composite material was used as a sample of Example B10.

Example B11

A composite material of sheet form was made in the same manner as in Example B8, except for replacing the cellulose microfiber dispersion of Example B1 with that of Example B5. The resulting composite material was used as a sample of Example B11.

Comparative Example B5

A composite material of sheet form was made in the same manner as in Example B8, except for replacing the cellulose microfiber dispersion of Example B1 with the same amount of di(trimethyl glycol) succinate (a dispersing medium). The resulting composite material was used as a sample of Comparative Example B5. The sample of Comparative Example B5 is a cellulose microfiber-free molded article composed solely of the base polymer (PLA) used in the composite materials of Examples B8 through B11.

Evaluation 2

The samples (composite materials) of Examples and Comparative Examples were evaluated for tensile modulus, tensile yield strength, and total light transmittance by the methods described. The thickness of each sample was measured with no load applied thereon. The results obtained are shown in Table 4.

TABLE 4

|  | Method of Making Composite Material | Cellulose Fiber Content (mass %) | Resin | Surfactant | Tensile Modulus (GPa) | Tensile Yield Strength (MPa) | Total Transmittance (%) | Thickness (mm) |
| --- | --- | --- | --- | --- | --- | --- | --- | --- |
| Example B8 | melt kneading | 0.2 | PLA | TBAH | 3.04 | 42.1 | 90 | 0.52 |
| Example B9 | melt kneading | 0.1 | PLA | TBAH | 2.54 | 40 | 90 | 0.53 |
| Example B10 | melt kneading | 0.1 | PLA | TEAH | 2.61 | 43 | 90 | 0.52 |
| Example B11 | melt kneading | 0.1 | PLA | Kotamin D86P | 2.30 | 29.5 | 85 | 0.52 |
| Compara. Example B5 | melt kneading | 0 | PLA | — | 2.06 | 26.9 | 90 | 0.53 |

As is apparent from the results shown in Table 4, the composite materials of Examples B8 through B11 exhibit sufficient mechanical strength for practical use, specifically 1.1 or more times the tensile modulus and tensile yield strength of the base polymer (Comparative Example B5), and high transparency as proved by their total light transmittance of 80% or more. These results reveal that tensile modulus and tensile yield strength of the base polymer are greatly improved by the use of a relatively small amount (5 mass % or less) of the cellulose composite fibers. The improving effects are considered attributed partly to the nanodispersibility of the cellulose composite microfibers and partly to the high interfacial strength due to the strong interaction between the functional groups (carboxyl groups and hydroxyl groups) of PLA and the carboxyl groups and hydroxyl groups on the surface of the cellulose composite microfibers. Because of such a small cellulose microfiber content, reduction in light transmittance of the PLA resin inherently possessing high transparency (high light transmittance) is minimized, so that the composite materials of these Examples retain the high transparency inherent to the resin. This suggests that the cellulose composite microfibers are nano-dispersed in the resin, though not observable by the state-of-the-art nanoanalysis technology. In contrast, the composite material of Comparative Example B5 is inferior in mechanical strength to the composite materials of Examples primarily due to the absence of the cellulose microfibers (cellulose composite microfibers).

Example B12

The cellulose microfiber dispersion of Example B1 was processed by the above discussed melt kneading method to make a composite material of sheet form, which was used as a sample of Example B12. A kneading machine (Laboplastomill from Toyo Seiki Seisakusho, Ltd.) was charged successively with 50 g of PLA (NW4032D, from Nature Works LLC) as a moldable resin, 5 g of the cellulose microfiber dispersion of Example B1, and 0.15 g of ethylenebis-12-hydroxystearamide (Slipax H, from Nippon Kasei Chemical Co., Ltd.) as a nucleating agent, followed by kneading at 180° C. and 50 rpm for 10 minutes to obtain a uniform mixture. The uniform mixture was set on a press (Labopress, from Tokyo Seiki Seisakusho), hot-pressed at 180° C. first under a low pressure (5 kg/cm²) for 3 minutes and then under a high pressure (200 kg/cm²) for 1 minute and then cold-pressed at 80° C. under a low pressure (5 kg/cm²) for 3 minutes and then under a high pressure (200 kg/cm²) for 1 minute to provide a composite material of sheet form with a thickness of about 0.5 mm.

Example B13

A cellulose microfiber dispersion (solid concentration: 3 mass %) was prepared in the same manner as in Example B1, except for changing the amount of the cellulose composite microfibers to 0.6 g (on solid basis). A composite material of sheet form was made in the same manner as in Example B12, except for using the resulting cellulose microfiber dispersion in place of the cellulose microfiber dispersion of Example B1. The resulting composite material was used as a sample of Example B13.

Example B14

A cellulose microfiber dispersion (solid concentration: 5 mass %) was prepared in the same manner as in Example B1, except for changing the amount of the cellulose composite microfibers to 1.0 g (on solid basis). A composite material of sheet form was made in the same manner as in Example B12, except for using the resulting cellulose microfiber dispersion in place of the cellulose microfiber dispersion of Example B1. The resulting composite material was used as a sample of Example B14.

Example B15

A cellulose microfiber dispersion (a composite dispersion as referred to above) was prepared by the method infra based on the second method described supra.

Materials used were (1) softwood bleached kraft pulp (from Fletcher Challenge Canada Ltd.; CSF: 650 ml) as natural cellulose fiber, (2) TEMPO (from Aldrich; free radical: 98%) as a catalyst for oxidation, (3) sodium hypochlorite (from Wako Pure Chemical Industries, Ltd.; Cl: 5%) as an oxidizer, and (4) sodium bromide (from Wako Pure Chemical Industries, Ltd.) as a re-oxidizer. The natural cellulose fibers weighing 100 g were stirred thoroughly in 9900 g of ion exchanged water. To the resulting slurry were added 1.25% of TEMPO, 14.2% of sodium bromide, and 28.4% of sodium hypochlorite in that order, each relative to the mass of the pulp. The pulp was oxidized at 20° while keeping the pH of the slurry at 10.5 by dropping 0.5 M sodium hydroxide using a pH-stat. After 120 minutes reacting, dropping of sodium hydroxide was stopped. The reaction product was sufficiently washed with ion exchanged water and dewatered to give reaction product fibers (oxidized pulp).

The reaction product fibers were dispersed in ion exchanged water to prepare an aqueous dispersion having a solid concentration of 1 mass %. The aqueous dispersion (300 g) was subjected to microfibrillation treatment in a mixer (Vita-Mix blender ABSOLUTE, available from Osaka Chemical Co., Ltd.) for 120 minutes to give cellulose microfibers. The average diameter and carboxyl group content of the cellulose microfibers were determined by the methods described supra. As a result, the cellulose microfibers thus prepared were found to have an average diameter of 3.1 nm, an average aspect ratio of 240, and a carboxyl group content of 1.2 mmol/g.

Two grams (on solid basis) of the cellulose microfibers and 400 g of ion exchanged water were mixed, and 10.8 g of 10% tetrabutylammonium hydroxide (TBAH) (from Wako Pure Chemical) was added thereto as a surfactant, followed by stirring for 24 hours. An excess amount of acetone was poured into the mixture to form agglomerates, which were collected by filtration through a glass filter and washed with ion exchanged water and then with acetone to give cellulose composite microfibers.

The solvent was removed from the resulting cellulose composite microfibers to a solid concentration of about 10%. A 0.2 g (on solid basis) portion of the cellulose composite microfibers and 20 g of di(methyl triglycol) succinate ((MeEO3) A1010, synthesized by referring to JP 2007-16092A) as a softening agent (dispersing medium) were mixed and stirred in an ultrasonic device (UP200H, from Hielscher) for 3 minutes. There was thus obtained a cellulose microfiber dispersion (solid concentration: 1 mass %) containing the cellulose composite microfibers and the organic solvent.

The resulting cellulose microfiber dispersion was processed by the above discussed melt kneading method to make a composite material of sheet form, which was used as a sample of Example B15. A kneading machine (Laboplastomill from Toyo Seiki Seisakusho, Ltd.) was charged successively with 50 g of PLA (NW4032D, from Nature Works LLC) as a moldable resin, 5 g of the cellulose microfiber dispersion of Example B1, and 0.15 g of ethylenebis-12-hydroxystearamide (Slipax H, from Nippon Kasei Chemical Co., Ltd.) as a nucleating agent, followed by kneading at 180° C. and 50 rpm for 10 minutes to obtain a uniform mixture. The uniform mixture was set on a press (Labopress, from Tokyo Seiki Seisakusho), hot-pressed at 180° C. first under a low pressure (5 kg/cm$^2$) for 3 minutes and then under a high pressure (200 kg/cm$^2$) for 1 minute and then cold-pressed at 80° C. under a low pressure (5 kg/cm$^2$) for 3 minutes and then under a high pressure (200 kg/cm$^2$) for 1 minute to provide a composite material of sheet form with a thickness of about 0.5 mm, which was used as a sample of Example B15.

Example B16

The cellulose composite microfibers (0.4 g, on solid basis) obtained in the same manner as in Example B15 and 20 g of di(methyl triglycol) succinate ((MeEO3) A1010, synthesized by referring to JP 2007-16092A) as a softening agent (dispersing medium) were mixed and stirred in an ultrasonic device (UP200H, from Hielscher) for 3 minutes. There was thus obtained a cellulose microfiber dispersion (solid concentration: 2 mass %) containing the cellulose composite microfibers and the organic solvent. The resulting cellulose microfiber dispersion was processed in the same manner as in Example B15 to make a composite material of sheet form, which was used as a sample of Example B16.

Example B17

To 10 g of di(methyl triglycol) succinate ((MeEO3) A1010, synthesized by referring to JP 2007-16092A) as a softening agent were added 0.1 g of cellulose nanofiber powder 3 and 0.3 g of 10% tetrabutylammonium hydroxide (TBAH) (from Wako Pure Chemical), followed by stirring to prepare a semitransparent dispersion. A kneading machine (Laboplastmill, from Toyo Seiki Seisakusho, Ltd.) was charged successively with 50 g of PLA (NW4032D, from Nature Works) as a biomass-derived polymer, 0.15 g of ethylenebis-12-hydroxystearamide (Slipax H, from Nippon Kasei Chemical Co., Ltd.) as a nucleating agent, and 5 g of the semitransparent dispersion, followed by kneading at 180° C. and 50 rpm for 10 minutes to obtain a uniform mixture. The uniform mixture was set on a press (Labopress, from Tokyo Seiki Seisakusho), hot-pressed at 180° C. first under a low pressure (5 kg/cm$^2$) for 3 minutes and then under a high pressure (200 kg/cm$^2$) for 1 minute and then cold-pressed at 20° C. under a low pressure (5 kg/cm$^2$) for 3 minutes and then under a high pressure (200 kg/cm$^2$) for 1 minute to provide a composite material of sheet form with a thickness of about 0.4 mm. The resulting composite material was used as a sample of Example B17.

Comparative Example B6

A composite material of sheet form was made in the same manner as in Example B12, except for replacing the cellulose microfiber dispersion with the same amount of di(trimethyl glycol) succinate (dispersing medium). The resulting composite material was used as a sample of Comparative Example B6. The sample of Comparative Example B6 is a cellulose microfiber-free molded article composed solely of the base polymer (PLA) used in the composite materials of Examples B12 through B17.

Evaluation 3

The samples (composite materials) of Examples and Comparative Examples were evaluated for tensile modulus, tensile yield strength, total light transmittance, and haze by the methods described. The results obtained are shown in Table 5.

TABLE 5

| | Method of Making Composite Material | Cellulose Fiber Content (mass %) | Resin | Surfactant | Tensile Modulus (GPa) | Tensile Yield Strength (MPa) | Total Transmittance (%) | Haze (%) | Thickness (mm) |
|---|---|---|---|---|---|---|---|---|---|
| Example B12 | melt kneading | 0.2 | PLA | TBAH | 1.4 | 39.0 | 89 | 18 | 0.41 |
| Example B13 | melt kneading | 0.3 | PLA | TBAH | 1.5 | 43.0 | 89 | 22 | 0.41 |
| Example B14 | melt kneading | 0.5 | PLA | TBAH | 1.8 | 50.0 | 85 | 38 | 0.38 |
| Example B15 | melt kneading | 0.1 | PLA | TBAH | 1.5 | 41.0 | 91 | 9 | 0.40 |
| Example B16 | melt kneading | 0.2 | PLA | TBAH | 1.2 | 35.0 | 90 | 12 | 0.43 |
| Example B17 | melt kneading | 0.1 | PLA | TBAH | 1.3 | 37.0 | 90 | 12 | 0.40 |
| Compara. Example B6 | melt kneading | 0 | PLA | — | 1.0 | 31.0 | 91 | 7 | 0.41 |

As is apparent from the results in Table 5, the composite materials of Examples B12 to B17 exhibit sufficient mechanical strength for practical use, specifically 1.1 or more times both the tensile modulus and the tensile yield strength of the base polymer (Comparative Example B6) and high transparency as proved by the total light transmittance of 80% or higher and the haze of 50% or less. In particular, the composite material of Example B15, the cellulose microfiber content of which is 0.1 mass %, shows practically no change in transparency (total light transmittance and haze) from Comparative Example B6 and yet exhibits high mechanical strength, specifically 1.5 times the tensile modulus of Comparative Example B6. Example B15 uses the cellulose microfiber dispersion prepared according to the above discussed first method (a surfactant is added to the reaction system after the step of microfibrillation), whilst Examples B12 to B14 use the cellulose microfiber dispersion prepared according to the above discussed second method (a surfactant is added to the reaction system before the step of microfibrillation). This difference in method for the preparation is believed to lead to the improved dispersibility of the cellulose composite microfibers demonstrated in Example B15, resulting in the high mechanical strength notwithstanding the low cellulose microfiber content. The composite material of Example B17, which contains cellulose composite microfibers obtained by treating cellulose microfibers having acid-form carboxyl groups with a surfactant thereby to have the surfactant adsorbed thereon, exhibits 1.2 or more times the tensile modulus and the tensile yield strength of the base polymer (Comparative Example B6) with an extremely small cellulose microfiber content of 1 mass % or less.

INDUSTRIAL APPLICABILITY

The composite materials of the invention (first and second aspects) are useful in applications to films for packaging a variety of daily goods (e.g., pouches and pillow bags), sheets (e.g., blister packages), and molded parts (e.g., bottles, caps, spoons, and tooth brush handles). They are especially suited to applications requiring mechanical strength, such as cars and information appliances.

The invention claimed is:

1. Cellulose composite microfibers obtained by adsorbing a surfactant onto cellulose microfibers having a carboxyl group content of 0.1 to 3 mmol/g;
   wherein the surfactant is a quaternary alkylammonium compound having four alkyl groups with no more than 4 carbon atoms per alkyl group; and
   wherein the alkyl groups are bound to a quaternary nitrogen atom of the quaternary alkylammonium compound.

2. A composite material comprising cellulose composite microfibers and a moldable resin, the cellulose composite microfibers being obtained by adsorbing a surfactant onto cellulose microfibers having a carboxyl group content of 0.1 to 3 mmol/g;
   wherein the surfactant is a quaternary alkylammonium compound having four alkyl groups with no more than 4 carbon atoms per alkyl group; and
   wherein the alkyl groups are bound to a quaternary nitrogen atom of the quaternary alkylammonium compound.

3. The composite material according to claim 2, wherein the resin is a biomass-derived polymer.

4. The composite material according to claim 3, wherein the biomass-derived polymer is polylactic acid.

5. The composite material according to claim 2, wherein the surfactant is tetraethylammonium hydroxide or tetrabutylammonium hydroxide.

6. The composite material according to claim 2, wherein the cellulose microfiber content is in the range of from 0.01% to 1% by mass.

\* \* \* \* \*